United States Patent
Hirata et al.

(10) Patent No.: US 11,119,315 B2
(45) Date of Patent: Sep. 14, 2021

(54) INFORMATION DISPLAY APPARATUS

(71) Applicants: MAXELL, LTD., Kyoto (JP); HITACHI INDUSTRY & CONTROL SOLUTIONS, LTD., Hitachi (JP)

(72) Inventors: Koji Hirata, Kyoto (JP); Masahiko Yatsu, Kyoto (JP); Kazuomi Kaneko, Kyoto (JP)

(73) Assignees: MAXELL, LTD., Kyoto (JP); HITACHI INDUSTRY & CONTROL SOLUTIONS, LTD., Hitachi (JP)

( * ) Notice: Subject to any disclaimer, the term of this patent is extended or adjusted under 35 U.S.C. 154(b) by 215 days.

(21) Appl. No.: 15/767,360

(22) PCT Filed: Oct. 15, 2015

(86) PCT No.: PCT/JP2015/079214
§ 371 (c)(1),
(2) Date: Apr. 8, 2019

(87) PCT Pub. No.: WO2017/064797
PCT Pub. Date: Apr. 20, 2017

(65) Prior Publication Data
US 2019/0265468 A1   Aug. 29, 2019

(51) Int. Cl.
*G02B 27/01* (2006.01)
*B60K 35/00* (2006.01)
(Continued)

(52) U.S. Cl.
CPC .......... *G02B 27/0101* (2013.01); *B60K 35/00* (2013.01); *G02B 27/0179* (2013.01);
(Continued)

(58) Field of Classification Search
CPC ............ G02B 27/0101; G02B 27/0179; G02B 2027/0185; G02B 2027/0187;
(Continued)

(56) References Cited

U.S. PATENT DOCUMENTS 5,486,840 A * 1/1996 Borrego ............. G02B 27/0101
345/7
5,497,170 A * 3/1996 Kato ........................ G02B 5/32
340/980
(Continued)

FOREIGN PATENT DOCUMENTS

JP     61-278820 A     12/1986
JP     04-128816 A      4/1992
(Continued)

OTHER PUBLICATIONS

International Search Report of PCT/JP2015/079214 dated Dec. 28, 2015.
(Continued)

*Primary Examiner* — Charles L Beard
(74) *Attorney, Agent, or Firm* — Mattingly & Malur, PC

(57) ABSTRACT

A small-sized information display apparatus capable of displaying, as virtual images, different pieces of video image information at different positions in a wide area of a windshield. An embodiment has a virtual image optical system in which a flat display forming video image information is arranged, and that includes a projected member for causing virtual images to be displayed at a plurality of positions ahead of a vehicle by reflecting a video image on the flat display, thereby forming the virtual images at the plurality of positions so as to correspond to a viewpoint position of a driver. The virtual image optical system is arranged so that video image light fluxes for establishing the respective virtual images are separated from and independent of one another between the flat display and a concave mirror, and is configured by arranging different optical elements so as to correspond to the respective light fluxes.

14 Claims, 18 Drawing Sheets

(51) Int. Cl.
  *G02F 1/1335* (2006.01)
  *G02F 1/13363* (2006.01)
  *G09G 3/36* (2006.01)
  *G02F 1/13357* (2006.01)
  *G02F 1/1333* (2006.01)

(52) U.S. Cl.
  CPC .... *G02F 1/13363* (2013.01); *G02F 1/133528* (2013.01); *G02F 1/133615* (2013.01); *G09G 3/36* (2013.01); *B60K 2370/1529* (2019.05); *B60K 2370/23* (2019.05); *B60K 2370/31* (2019.05); *B60K 2370/331* (2019.05); *B60K 2370/48* (2019.05); *B60K 2370/52* (2019.05); *G02B 2027/0185* (2013.01); *G02B 2027/0187* (2013.01); *G02F 1/13336* (2013.01); *G02F 1/133562* (2021.01); *G02F 1/133638* (2021.01); *G02F 2413/01* (2013.01); *G02F 2413/05* (2013.01); *G09G 2300/026* (2013.01); *G09G 2340/0464* (2013.01); *G09G 2354/00* (2013.01); *G09G 2380/10* (2013.01)

(58) Field of Classification Search
  CPC ............ B60K 35/00; B60K 2370/1529; B60K 2370/48; B60K 2370/31; B60K 2370/52; B60K 2370/23; B60K 2370/331; G02F 1/133528; G02F 1/133615; G02F 1/13363; G02F 1/13336; G02F 2001/133562; G02F 2001/133638; G02F 2413/01; G02F 2413/05; G09G 3/36; G09G 2300/026; G09G 2340/0464; G09G 2354/00; G09G 2380/10
  See application file for complete search history.

(56) References Cited

U.S. PATENT DOCUMENTS

| | | | | |
|---|---|---|---|---|
| 5,729,242 | A * | 3/1998 | Margerum | G02B 27/01 345/7 |
| 5,864,432 | A * | 1/1999 | Deter | G02B 27/01 359/634 |
| 7,315,241 | B1 * | 1/2008 | Daily | G02B 27/01 340/332 |
| 7,508,356 | B2 * | 3/2009 | Kanamori | G02B 17/023 345/7 |
| 7,690,799 | B2 * | 4/2010 | Nestorovic | G02B 27/0101 359/601 |
| 8,098,171 | B1 * | 1/2012 | Szczerba | B60Q 9/008 340/438 |
| 9,030,749 | B2 * | 5/2015 | Lescure | G02B 27/0101 359/630 |
| 9,291,819 | B2 | 3/2016 | Ferri | |
| 9,939,638 | B2 * | 4/2018 | Yagi | G02B 27/0101 |
| 10,018,841 | B1 * | 7/2018 | Chen | G02B 27/0101 |
| 10,185,152 | B2 * | 1/2019 | Yamamura | G02B 27/0179 |
| 10,197,414 | B2 * | 2/2019 | Iguchi | G09G 5/00 |
| 10,338,397 | B1 * | 7/2019 | Seo | G02B 27/0179 |
| 10,453,426 | B2 * | 10/2019 | Kawaji | G09G 5/14 |
| 10,473,480 | B2 * | 11/2019 | Arita | G01C 21/3679 |
| 10,502,955 | B2 * | 12/2019 | Kimura | H04N 5/23293 |
| 10,549,638 | B2 * | 2/2020 | Suzuki | G09G 3/346 |
| 10,551,619 | B2 * | 2/2020 | Suzuki | G08G 1/161 |
| 10,573,074 | B1 * | 2/2020 | Bull | G02B 27/0179 |
| 10,578,864 | B2 * | 3/2020 | Misawa | G02B 27/0101 |
| 10,606,079 | B1 * | 3/2020 | Keith | G02B 27/0101 |
| 10,642,037 | B2 * | 5/2020 | Takazawa | H04N 5/74 |
| 10,657,670 | B2 * | 5/2020 | Gomezcaballero | G08G 1/04 |
| 10,670,864 | B2 * | 6/2020 | Hirata | G02B 5/3025 |
| 10,672,270 | B2 * | 6/2020 | Kim | G05D 1/0276 |
| 10,696,159 | B2 * | 6/2020 | Saisho | G08G 1/0968 |
| 10,880,530 | B2 * | 12/2020 | Miao | H04N 9/3194 |
| 10,942,353 | B2 * | 3/2021 | Hirata | G02B 17/08 |
| 10,976,546 | B2 * | 4/2021 | Nagano | G09G 5/377 |
| 2002/0140633 | A1 * | 10/2002 | Rafii | G06F 3/04815 345/8 |
| 2003/0142041 | A1 * | 7/2003 | Barlow | G06K 9/0061 345/8 |
| 2006/0071877 | A1 * | 4/2006 | Kanamori | G02B 27/0101 345/7 |
| 2009/0153962 | A1 * | 6/2009 | Okada | G02B 27/0101 359/485.02 |
| 2009/0160736 | A1 * | 6/2009 | Shikita | G02B 27/0101 345/7 |
| 2009/0231720 | A1 * | 9/2009 | Chengalva | G02B 27/0101 359/630 |
| 2009/0303597 | A1 * | 12/2009 | Miyawaki | G02B 27/46 359/559 |
| 2010/0073636 | A1 * | 3/2010 | Sasaki | G02B 30/26 353/13 |
| 2010/0214635 | A1 * | 8/2010 | Sasaki | G02B 27/0101 359/15 |
| 2010/0253541 | A1 * | 10/2010 | Seder | G08G 1/165 340/905 |
| 2010/0253595 | A1 * | 10/2010 | Szczerba | G01S 13/931 345/7 |
| 2010/0289632 | A1 * | 11/2010 | Seder | G02B 27/01 340/436 |
| 2011/0227717 | A1 * | 9/2011 | Kumon | G02B 27/01 340/441 |
| 2012/0075708 | A1 * | 3/2012 | Hagiwara | G02B 27/0101 359/630 |
| 2012/0169752 | A1 * | 7/2012 | Kurozuka | G02B 27/0101 345/545 |
| 2012/0173069 | A1 * | 7/2012 | Tsimhoni | G01C 21/365 701/25 |
| 2012/0299764 | A1 * | 11/2012 | Haneda | G01S 7/4817 342/54 |
| 2012/0313909 | A1 * | 12/2012 | Ishida | G02B 27/0101 345/207 |
| 2013/0141250 | A1 * | 6/2013 | Mathieu | B60K 35/00 340/901 |
| 2013/0141311 | A1 * | 6/2013 | Ho | G02B 26/0833 345/7 |
| 2013/0188258 | A1 * | 7/2013 | Mathieu | G08G 1/166 359/630 |
| 2013/0188260 | A1 * | 7/2013 | Matsushita | G02B 27/01 359/632 |
| 2013/0265646 | A1 * | 10/2013 | Sakai | G02B 27/01 359/631 |
| 2014/0152711 | A1 * | 6/2014 | Sekiya | G03B 21/00 345/690 |
| 2014/0177040 | A1 * | 6/2014 | Uehara | G02B 5/3033 359/352 |
| 2014/0268353 | A1 * | 9/2014 | Fujimura | G02B 27/01 359/630 |
| 2014/0268358 | A1 * | 9/2014 | Kusaka | G02B 5/0278 359/631 |
| 2014/0293432 | A1 * | 10/2014 | Takemoto | G03B 21/142 359/630 |
| 2014/0293467 | A1 * | 10/2014 | Palikaras | G02B 5/0841 359/885 |
| 2014/0340654 | A1 * | 11/2014 | Kuwata | G03B 21/142 353/69 |
| 2014/0362448 | A1 * | 12/2014 | Yamada | G02B 27/0101 359/631 |
| 2015/0015479 | A1 * | 1/2015 | Cho | B60K 35/00 345/156 |
| 2015/0015962 | A1 * | 1/2015 | Takasu | G02B 27/0101 359/630 |
| 2015/0015964 | A1 * | 1/2015 | Takasu | G02B 27/0101 359/630 |
| 2015/0061976 | A1 * | 3/2015 | Ferri | G02B 27/0101 345/9 |
| 2015/0156196 | A1 * | 6/2015 | Kim | G06F 21/84 345/156 |
| 2015/0219803 | A1 * | 8/2015 | Inamoto | G02B 3/0043 359/627 |

(56) References Cited

U.S. PATENT DOCUMENTS

| | | | |
|---|---|---|---|
| 2015/0232030 A1* | 8/2015 | Bongwald | B60R 1/00 348/115 |
| 2015/0316765 A1* | 11/2015 | Kim | H04N 5/247 345/7 |
| 2016/0003636 A1* | 1/2016 | Ng-Thow-Hing | G01C 21/3658 701/26 |
| 2016/0086513 A1* | 3/2016 | Uejima | H04L 67/12 434/201 |
| 2016/0110621 A1* | 4/2016 | Tsimhoni | B60K 35/00 382/104 |
| 2016/0116735 A1* | 4/2016 | Hayashi | G02B 3/0006 345/7 |
| 2016/0124231 A1* | 5/2016 | Watanabe | G02B 13/16 359/633 |
| 2016/0125631 A1* | 5/2016 | Ham | G02B 27/01 345/633 |
| 2016/0129836 A1* | 5/2016 | Sugita | B62D 15/0295 701/41 |
| 2016/0167514 A1* | 6/2016 | Nishizaki | G09G 5/377 345/7 |
| 2016/0170205 A1* | 6/2016 | Yamaoka | G02B 27/01 359/630 |
| 2016/0170487 A1* | 6/2016 | Saisho | B60K 35/00 345/156 |
| 2016/0178902 A1* | 6/2016 | Ando | B60R 1/00 348/115 |
| 2016/0187666 A1* | 6/2016 | Manns | G02B 27/017 359/479 |
| 2016/0216521 A1* | 7/2016 | Yachida | G02B 27/0179 |
| 2016/0266390 A1* | 9/2016 | Seo | G09G 3/001 |
| 2016/0266391 A1* | 9/2016 | Han | G09G 3/001 |
| 2016/0313562 A1* | 10/2016 | Saisho | G02B 27/0179 |
| 2016/0334623 A1* | 11/2016 | Kishi | G06F 3/165 |
| 2016/0349066 A1* | 12/2016 | Chung | G01C 21/3658 |
| 2017/0013239 A1* | 1/2017 | Tabata | H04N 9/3185 |
| 2017/0023789 A1* | 1/2017 | Nakamura | B60K 35/00 |
| 2017/0045740 A1* | 2/2017 | Hirata | G09G 3/2003 |
| 2017/0054973 A1* | 2/2017 | Kasazumi | G02B 30/34 |
| 2017/0069212 A1* | 3/2017 | Miyazawa | G08G 1/16 |
| 2017/0085847 A1* | 3/2017 | Kurosawa | B60K 35/00 |
| 2017/0090275 A1* | 3/2017 | Sugiyama | G02B 26/105 |
| 2017/0123212 A1* | 5/2017 | Kawakami | G02B 5/02 |
| 2017/0146803 A1* | 5/2017 | Kishigami | H04N 9/3167 |
| 2017/0160544 A1* | 6/2017 | Takemoto | G02B 27/104 |
| 2017/0160552 A1* | 6/2017 | Muramatsu | G02B 27/0101 |
| 2017/0161009 A1* | 6/2017 | Ogisu | G06F 3/1446 |
| 2017/0230628 A1* | 8/2017 | Ichikawa | H04N 9/3182 |
| 2017/0235030 A1* | 8/2017 | Tanaka | G02B 5/0816 349/11 |
| 2017/0261746 A1* | 9/2017 | Tam | H04N 13/332 |
| 2017/0269364 A1* | 9/2017 | Fujita | B60K 37/04 |
| 2017/0269428 A1* | 9/2017 | Otani | G02B 27/0101 |
| 2017/0329133 A1* | 11/2017 | Nambara | G02B 27/0101 |
| 2017/0343799 A1* | 11/2017 | Ito | G02B 27/01 |
| 2017/0357088 A1* | 12/2017 | Matsuzaki | B60K 35/00 |
| 2017/0361579 A1* | 12/2017 | Chen | B32B 27/22 |
| 2017/0363863 A1* | 12/2017 | Chen | G02B 27/0018 |
| 2018/0011314 A1* | 1/2018 | Quiroz de la Mora | G02B 27/0101 |
| 2018/0015876 A1* | 1/2018 | Yamagata | B60Q 3/12 |
| 2018/0088255 A1* | 3/2018 | Sakai | G02B 3/0006 |
| 2018/0090007 A1* | 3/2018 | Takemori | G06F 3/0304 |
| 2018/0095277 A1* | 4/2018 | Tai | G02B 27/0101 |
| 2018/0105040 A1* | 4/2018 | Ryu | G08G 1/096775 |
| 2018/0120562 A1* | 5/2018 | Yata | G02B 27/283 |
| 2018/0120572 A1* | 5/2018 | Watanabe | G06K 9/00671 |
| 2018/0124364 A1* | 5/2018 | Yata | H04N 9/3167 |
| 2018/0129050 A1* | 5/2018 | Hayashi | G09G 3/001 |
| 2018/0143431 A1* | 5/2018 | Matsuura | G02B 27/0093 |
| 2018/0143443 A1* | 5/2018 | Fujita | G06F 3/147 |
| 2018/0144672 A1* | 5/2018 | Fujita | G09G 5/37 |
| 2018/0148072 A1* | 5/2018 | Kamiya | G06K 9/00832 |
| 2018/0157036 A1* | 6/2018 | Choi | G02B 27/0179 |
| 2018/0164585 A1* | 6/2018 | Nambara | B60K 37/02 |
| 2018/0164998 A1* | 6/2018 | Fujita | G06T 3/40 |
| 2018/0180880 A1* | 6/2018 | Katagiri | G02B 27/0101 |
| 2018/0187397 A1* | 7/2018 | Fujita | G09G 3/002 |
| 2018/0210199 A1* | 7/2018 | Yokoe | B60K 37/02 |
| 2018/0210396 A1* | 7/2018 | Popovich | G03H 1/0248 |
| 2018/0218713 A1* | 8/2018 | Kusanagi | G02B 27/0101 |
| 2018/0231772 A1* | 8/2018 | Han | G02B 27/0101 |
| 2018/0239152 A1* | 8/2018 | Kuo | G02B 27/0149 |
| 2018/0253904 A1* | 9/2018 | Kuwabara | G08G 1/167 |
| 2018/0259770 A1* | 9/2018 | Kuzuhara | G06K 9/00671 |
| 2018/0259771 A1* | 9/2018 | Kuzuhara | G02B 27/0093 |
| 2018/0267304 A1* | 9/2018 | Sasaki | G02B 27/0101 |
| 2018/0276908 A1* | 9/2018 | Mader | G09G 3/001 |
| 2018/0284408 A1* | 10/2018 | Imaoka | G02B 15/20 |
| 2018/0284436 A1* | 10/2018 | Ichinokawa | B60K 37/02 |
| 2018/0299653 A1* | 10/2018 | Kubota | G02B 13/16 |
| 2018/0299672 A1* | 10/2018 | Yatsu | G02B 27/0983 |
| 2018/0335634 A1* | 11/2018 | Oliveira | G02B 27/0179 |
| 2018/0338094 A1* | 11/2018 | Fujita | H04N 5/272 |
| 2018/0341109 A1* | 11/2018 | Lin | G02B 27/0149 |
| 2018/0341110 A1* | 11/2018 | Hirata | G06F 3/013 |
| 2018/0345860 A1* | 12/2018 | Imamura | G02B 27/0025 |
| 2018/0350236 A1* | 12/2018 | Yamaguchi | B60K 35/00 |
| 2018/0352164 A1* | 12/2018 | Higuchi | H04N 9/3155 |
| 2018/0372923 A1* | 12/2018 | Wijaya | G02B 27/0179 |
| 2018/0373027 A1* | 12/2018 | Higuchi | G02B 27/0101 |
| 2018/0373028 A1* | 12/2018 | Yamaguchi | G02B 27/0101 |
| 2018/0373030 A1* | 12/2018 | Kusanagi | G09G 5/00 |
| 2019/0011712 A1* | 1/2019 | Nagano | G02B 27/0101 |
| 2019/0025580 A1* | 1/2019 | Nagano | G02B 27/64 |
| 2019/0033584 A1* | 1/2019 | Aoki | B60K 37/02 |
| 2019/0034731 A1* | 1/2019 | Lee | G02B 27/0101 |
| 2019/0049724 A1* | 2/2019 | Kimura | G06K 9/00671 |
| 2019/0049726 A1* | 2/2019 | Nomura | B60K 35/00 |
| 2019/0056588 A1* | 2/2019 | Nambara | G02B 27/0101 |
| 2019/0061529 A1* | 2/2019 | Saisho | B60K 35/00 |
| 2019/0063942 A1* | 2/2019 | Kang | G05D 1/0223 |
| 2019/0084419 A1* | 3/2019 | Suzuki | G02B 27/01 |
| 2019/0086661 A1* | 3/2019 | Misawa | G02B 27/0101 |
| 2019/0096365 A1* | 3/2019 | Pasca | G02B 27/01 |
| 2019/0116344 A1* | 4/2019 | Nguyen | H04N 9/317 |
| 2019/0118824 A1* | 4/2019 | Mimura | B60K 35/00 |
| 2019/0129167 A1* | 5/2019 | Hayashi | G02B 27/286 |
| 2019/0129170 A1* | 5/2019 | Matsuzaki | G02B 27/0101 |
| 2019/0129172 A1* | 5/2019 | Misawa | G02B 27/0149 |
| 2019/0137759 A1* | 5/2019 | Hirata | G02B 27/01 |
| 2019/0139286 A1* | 5/2019 | Shimoda | G02B 27/0101 |
| 2019/0139298 A1* | 5/2019 | Cho | G02B 27/0179 |
| 2019/0168610 A1* | 6/2019 | Nakane | G09G 3/20 |
| 2019/0172419 A1* | 6/2019 | Hwang | G09G 5/10 |
| 2019/0187467 A1* | 6/2019 | Fujita | G09G 5/00 |
| 2019/0196184 A1* | 6/2019 | Takizawa | G01C 3/08 |
| 2019/0196187 A1* | 6/2019 | Kasazumi | B60K 35/00 |
| 2019/0196188 A1* | 6/2019 | Hirata | B60K 1/00 |
| 2019/0196189 A1* | 6/2019 | Kim | B60K 35/00 |
| 2019/0196203 A1* | 6/2019 | Kubo | G02F 1/133528 |
| 2019/0210526 A1* | 7/2019 | Takiguchi | G02B 27/0101 |
| 2019/0212550 A1* | 7/2019 | Fujita | G02B 27/0006 |
| 2019/0213932 A1* | 7/2019 | Yoneyama | B60K 35/00 |
| 2019/0213937 A1* | 7/2019 | Oshima | G08G 1/163 |
| 2019/0219818 A1* | 7/2019 | Mattinson | G02B 27/0172 |
| 2019/0219821 A1* | 7/2019 | Sugiyama | G02B 27/0101 |
| 2019/0227285 A1* | 7/2019 | Wang | G02B 13/0045 |
| 2019/0227307 A1* | 7/2019 | Yamaguchi | G02B 27/0101 |
| 2019/0227308 A1* | 7/2019 | Yokoe | G02B 27/0101 |
| 2019/0230328 A1* | 7/2019 | Oshima | H04N 9/3147 |
| 2019/0235196 A1* | 8/2019 | Hong | G03B 21/14 |
| 2019/0235238 A1* | 8/2019 | Choi | G02B 5/3066 |
| 2019/0235239 A1* | 8/2019 | Kim | G02B 27/0101 |
| 2019/0235240 A1* | 8/2019 | Nagano | G02F 1/13 |
| 2019/0235241 A1* | 8/2019 | Suzuki | B60R 11/02 |
| 2019/0241070 A1* | 8/2019 | Ota | G02B 27/01 |
| 2019/0244587 A1* | 8/2019 | Hada | G06F 3/147 |
| 2019/0255946 A1* | 8/2019 | Takahashi | G02B 27/0149 |
| 2019/0258057 A1* | 8/2019 | Hada | B60K 35/00 |
| 2019/0265470 A1* | 8/2019 | Takase | G02B 5/003 |
| 2019/0265582 A1* | 8/2019 | Sakai | G02B 27/0101 |

(56) References Cited

U.S. PATENT DOCUMENTS

| | | | |
|---|---|---|---|
| 2019/0271840 A1* | 9/2019 | Kishigami | G02B 27/0101 |
| 2019/0271905 A1* | 9/2019 | Fujita | H04N 9/3141 |
| 2019/0281264 A1* | 9/2019 | Fujita | H04N 9/3179 |
| 2019/0285877 A1* | 9/2019 | Ogino | G02B 27/0031 |
| 2019/0285884 A1* | 9/2019 | Fujita | G02B 5/26 |
| 2019/0285885 A1* | 9/2019 | Satoh | G02B 27/0101 |
| 2019/0285887 A1* | 9/2019 | Yasui | B60K 35/00 |
| 2019/0285906 A1* | 9/2019 | Ogino | B60K 35/00 |
| 2019/0291579 A1* | 9/2019 | Fujita | G02B 27/01 |
| 2019/0302453 A1* | 10/2019 | Oshima | G03B 21/00 |
| 2019/0302458 A1* | 10/2019 | Oshima | G03B 21/30 |
| 2019/0302583 A1* | 10/2019 | Taniguchi | G03B 21/145 |
| 2019/0308502 A1* | 10/2019 | Yoneyama | B60S 1/04 |
| 2019/0317322 A1* | 10/2019 | Hayakawa | B60K 35/00 |
| 2019/0317324 A1* | 10/2019 | Meijering | G03B 21/208 |
| 2019/0317325 A1* | 10/2019 | Malinovskaya | G02B 27/0101 |
| 2019/0318706 A1* | 10/2019 | Peng | G02B 26/08 |
| 2019/0339519 A1* | 11/2019 | Toki | G02B 27/01 |
| 2019/0339520 A1* | 11/2019 | Miyamoto | G02B 27/01 |
| 2019/0346676 A1* | 11/2019 | Hirata | H04N 9/3179 |
| 2019/0346677 A1* | 11/2019 | Tanabe | G02B 27/0101 |
| 2019/0359228 A1* | 11/2019 | Banno | B60W 40/072 |
| 2019/0361233 A1* | 11/2019 | Ogawa | G06T 7/70 |
| 2019/0361234 A1* | 11/2019 | Hayakawa | G02B 27/0172 |
| 2019/0369393 A1* | 12/2019 | Misawa | G02B 27/0149 |
| 2019/0369396 A1* | 12/2019 | Smith | G02B 27/0179 |
| 2019/0369398 A1* | 12/2019 | Chen | G02B 27/0025 |
| 2019/0371281 A1* | 12/2019 | Koyama | G09G 3/002 |
| 2019/0391388 A1* | 12/2019 | Lambert | B60K 37/00 |
| 2019/0391389 A1* | 12/2019 | Takazawa | G02B 27/0101 |
| 2019/0391394 A1* | 12/2019 | Shinkawa | G06K 9/3241 |
| 2020/0012097 A1* | 1/2020 | Kubota | G02B 27/01 |
| 2020/0018976 A1* | 1/2020 | Van Wiemeersch | G10L 15/18 |
| 2020/0018977 A1* | 1/2020 | Qin | G02B 5/10 |
| 2020/0026073 A1* | 1/2020 | Nambara | G02B 5/0816 |
| 2020/0033603 A1* | 1/2020 | Kweon | G02B 17/06 |
| 2020/0050001 A1* | 2/2020 | Watanabe | G02B 27/0179 |
| 2020/0055399 A1* | 2/2020 | Yamada | H04N 13/346 |
| 2020/0055400 A1* | 2/2020 | Edmonds | G02B 27/0101 |
| 2020/0057317 A1* | 2/2020 | Weindorf | B60K 37/02 |
| 2020/0062276 A1* | 2/2020 | Yuan | B60W 50/14 |
| 2020/0064629 A1* | 2/2020 | Yamashita | G02B 27/0101 |
| 2020/0064640 A1* | 2/2020 | Nagano | G02B 27/0101 |
| 2020/0070660 A1* | 3/2020 | Triglia | G02B 27/01 |
| 2020/0089972 A1* | 3/2020 | Yu | G06T 19/006 |
| 2020/0103652 A1* | 4/2020 | Onda | G02B 27/0103 |
| 2020/0105224 A1* | 4/2020 | Higashiyama | H04N 9/3155 |
| 2020/0106999 A1* | 4/2020 | Okazaki | H04N 9/3182 |
| 2020/0159013 A1* | 5/2020 | Hirata | G02B 27/0101 |
| 2020/0201037 A1* | 6/2020 | Yamamoto | G02B 5/0833 |
| 2020/0209638 A1* | 7/2020 | Osmanis | G02B 30/52 |
| 2020/0247240 A1* | 8/2020 | Hirata | G02B 27/0179 |
| 2020/0249479 A1* | 8/2020 | Hirata | G02B 27/0955 |
| 2020/0252602 A1* | 8/2020 | Oonishi | G02B 27/0179 |
| 2020/0278541 A1* | 9/2020 | Kim | G02B 27/0101 |
| 2020/0282832 A1* | 9/2020 | Watanabe | G01C 21/365 |
| 2020/0298704 A1* | 9/2020 | Hirata | G02B 26/101 |
| 2020/0301140 A1* | 9/2020 | Kuzuhara | G02B 27/01 |
| 2020/0301141 A1* | 9/2020 | Kuzuhara | G02B 27/0101 |
| 2020/0301145 A1* | 9/2020 | Li | G02B 27/0149 |
| 2020/0319456 A1* | 10/2020 | Yatsu | G02B 17/0621 |
| 2020/0320960 A1* | 10/2020 | Yamase | G09G 5/373 |
| 2020/0353816 A1* | 11/2020 | Hirata | B60K 35/00 |
| 2020/0355914 A1* | 11/2020 | Albesa | H04N 13/363 |
| 2020/0355930 A1* | 11/2020 | Kasazumi | B60K 35/00 |
| 2020/0361482 A1* | 11/2020 | Choi | B60K 35/00 |
| 2020/0379252 A1* | 12/2020 | Kuzuhara | G02B 27/0101 |
| 2021/0011287 A1* | 1/2021 | King | G02B 27/0149 |
| 2021/0020145 A1* | 1/2021 | Hirata | G09G 3/002 |
| 2021/0041707 A1* | 2/2021 | Misawa | G02B 27/0179 |
| 2021/0063754 A1* | 3/2021 | Lee | G02B 27/0176 |

FOREIGN PATENT DOCUMENTS

| | | |
|---|---|---|
| JP | 07-270768 A | 10/1995 |
| JP | 10-082969 A | 3/1998 |
| JP | 2008-083307 A | 4/2008 |
| JP | 2009-116163 A | 5/2009 |
| JP | 2009-229552 A | 10/2009 |
| JP | 2012-501472 A | 1/2012 |
| JP | 2013-032087 A | 2/2013 |
| JP | 2013-214008 A | 10/2013 |
| JP | 2014-010321 A | 1/2014 |
| JP | 2014-123076 A | 7/2014 |
| JP | 2015-034919 A | 2/2015 |
| JP | 2015-048007 A | 3/2015 |
| JP | 2015-87619 A | 5/2015 |
| WO | 2015/019567 A1 | 2/2015 |
| WO | 2015/141745 A1 | 9/2015 |

OTHER PUBLICATIONS

Japanese Office Action received in corresponding Japanese Application No. 2017-545057 dated Oct. 23, 2019.

* cited by examiner

FIG. 11
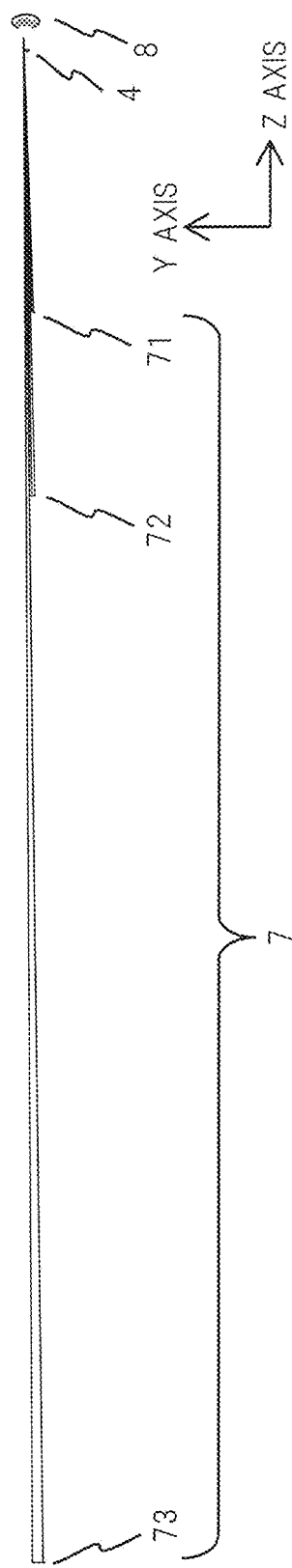
(a)
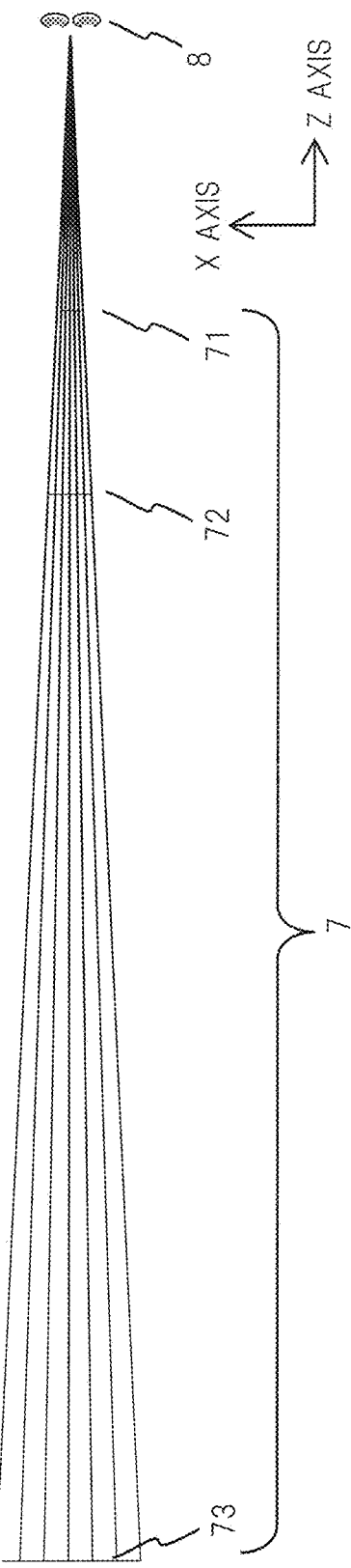
(b)

INFORMATION DISPLAY APPARATUS

TECHNICAL FIELD

The present invention relates to an information display apparatus which projects an image onto a windshield of an automobile, a train, an airplane, or the like (hereinafter referred generally to a "vehicle"), and relates to a virtual image optical system, in which the image is observed as a virtual image through the windshield, and an information display apparatus using the same.

BACKGROUND ART

A so-called head-up-display (HUD) device, which projects video image light onto a windshield of an automobile to form a virtual image and displays traffic information such as route information and traffic jam information and automobile information such as a remaining fuel amount and a cooling water temperature, has already been known by Patent Document 1 described below.

In this type of information display apparatus, it has been required for the purpose of making it easy for the driver to recognize information that virtual images are formed at a plurality of positions depending on a visible position of a driver, that is, a distance to be formed by the virtual images is matched with the visible position of the driver. Thus, as disclosed also in, for example, Patent Document 2 described below, some of images are respectively formed far (at a long distance) and near (in a short distance) from the driver.

RELATED ART DOCUMENTS

Patent Documents

Patent Document 1: Japanese Patent Application Laid-Open No. 2009-229552
Patent Document 2: Japanese Patent Application Laid-Open No. 2015-34919

SUMMARY OF THE INVENTION

Problems to be Solved by the Invention

An example of the head-up-display device disclosed in Patent Document 1 is configured so that video image light displayed on a liquid crystal display panel is mapped as a real image in a relay optical system ("Ir" in FIG. 2 in Patent Document 1) to observe a virtual image ("Iv" in the same drawing) via an eyepiece optical system ("L1" illustrated in the same drawing). When arranged by a mapping relationship, the video image light (a plane) on a liquid crystal display panel is mapped to the real image Ir (a plane) and the real image Ir (the plane) is further mapped to the virtual image Iv (a plane).

However, a foreground of the driver is not a plane having a two-dimensional shape but a space having a three-dimensional shape. Therefore, a sight line direction from the driver riding in an automobile (a driver's own vehicle) and a distance thereto will be described with reference to FIG. 18.

In a visual field range serving as a foreground viewed by a driver of a driver's own vehicle 101, there exist a forward running car 102 running ahead, a road surface 105 (e.g., presence or absence etc. of a falling object (s) on the road surface) immediately in front of the forward running car 102, a bicycle running near the car at an end of a road, a pedestrian on a sidewalk, and the like.

A sight line direction 103 of viewing the forward running car 102 running ahead is a direction toward which a sight line is slightly lowered from a directly forward direction. However, a sight line direction 104 of viewing the road surface 105 immediately in back of the forward running car on a road becomes a direction of further lowering the above slight line direction. Thus, it is understood that a distance to an object which the driver is to pay attention to while driving differs is different depending on the sight line direction.

Therefore, in order to further improve safety of driving of the automobile, it is important to shorten a time period taken to focus eyes by bringing, close to a distance to the object to be watched while driving, a distance to a virtual image to be displayed at that time.

Additionally, an example of a head mounted display device disclosed in Patent Document 2 described above is configured to form virtual images at different distances from a driver. However, more specifically, it is essential that a screen is selected depending on a display content and a variable focus lens is focused on the selected screen at high speed. Thus, used as the variable focus lens is "a liquid lens which changes a liquid interface of a liquid enclosed in a container", "a concave mirror configured to be able to change a curvature", or the like. This brings increases in size and cost of the head mounted display device.

Further, if a plurality of viewpoint positions of the driver exist on a reflection surface of a windshield serving as a projected member (6), a position of the eyes of the driver is different from center positions of a curvature radius of the windshield in a vertical direction of a vehicle body and a curvature radius in a horizontal direction of the vehicle body. Therefore, a distortion occurs in a displayed image, but this point has not been considered at all.

As described in the foregoing, it has been difficult in the above-described conventional information display apparatus to inhibit upsizing and complication of an apparatus configuration and form the virtual images at the different viewpoint positions (distances) of the driver. Further, the point that the distortion occurs depending on the viewpoint position of the driver has not been considered about a video image to be displayed at all.

Therefore, the present invention has been accomplished in view of the problems on the above-described conventional techniques. More specifically, the present invention has an object of providing an information display apparatus capable of also forming virtual images having high visibility also at different viewpoint positions (distances) from the driver while inhibiting the upsizing and complication of the apparatus.

Means for Solving the Problems

The present invention made for achieving the above object is, as an example, an information display apparatus displaying video image information about a virtual image on a windshield of a vehicle, the information display apparatus including: a flat display displaying the video image information; and a virtual image optical system displaying a plurality of virtual images ahead of the vehicle by causing light emitted from the flat display to reflect on the windshield, in which: the virtual image optical system includes a concave mirror and a plurality of optical elements; the plurality of optical elements are arranged so as to correspond to video image light fluxes for establishing the respective virtual images separated between the flat display and the concave mirror, the respective virtual images being established so as to cause a virtual image V3 overlapping a background to be established in an upper portion of the windshield, and cause a virtual image V1 overlapping a foreground to be established toward a lower portion from the upper portion of the windshield; and respective sizes of the virtual image V3 and the virtual image V1 further satisfy the following relationship, and the plurality of virtual images are formed at a plurality of positions so as to correspond to a viewpoint position of a driver:

V3>V1.

Effects of the Invention

According to the present invention described above, provided can be the information display apparatus capable of also forming the virtual images having high visibility also at the different viewpoint positions (distances) from the driver while inhibiting the upsizing and complication of the apparatus.

BRIEF DESCRIPTIONS OF THE DRAWINGS

Figure 12:
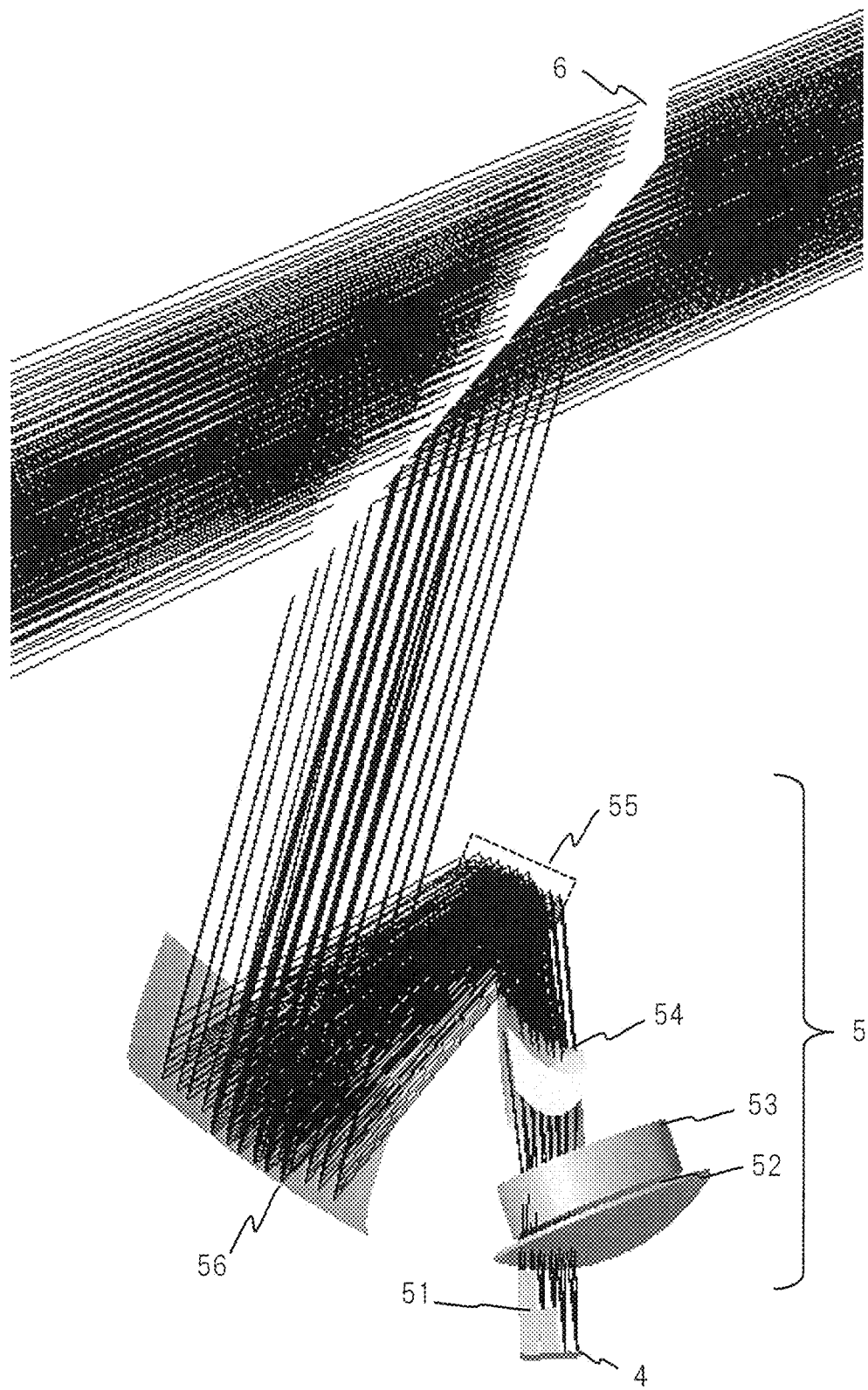
Figure 13:
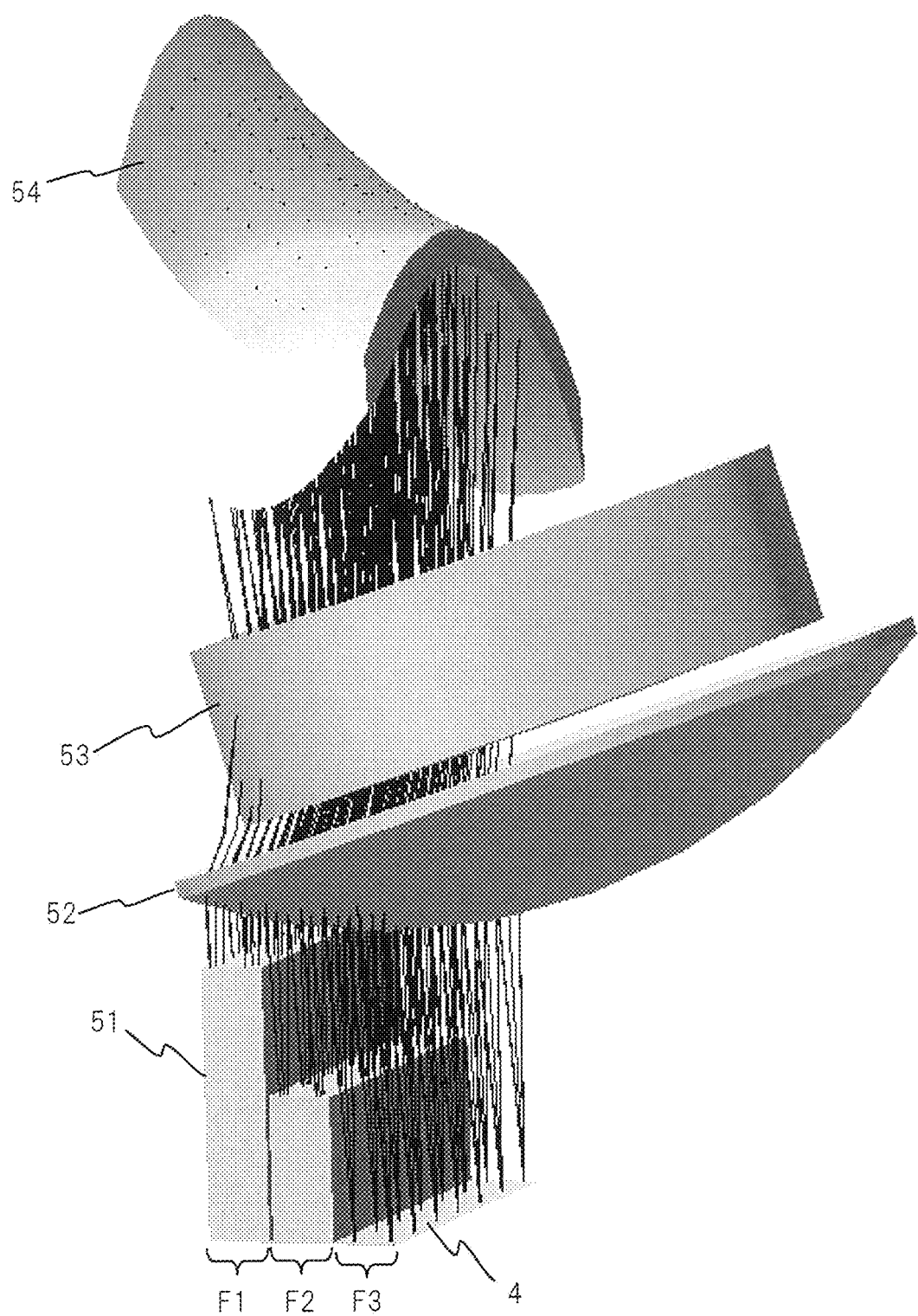
Figure 14:
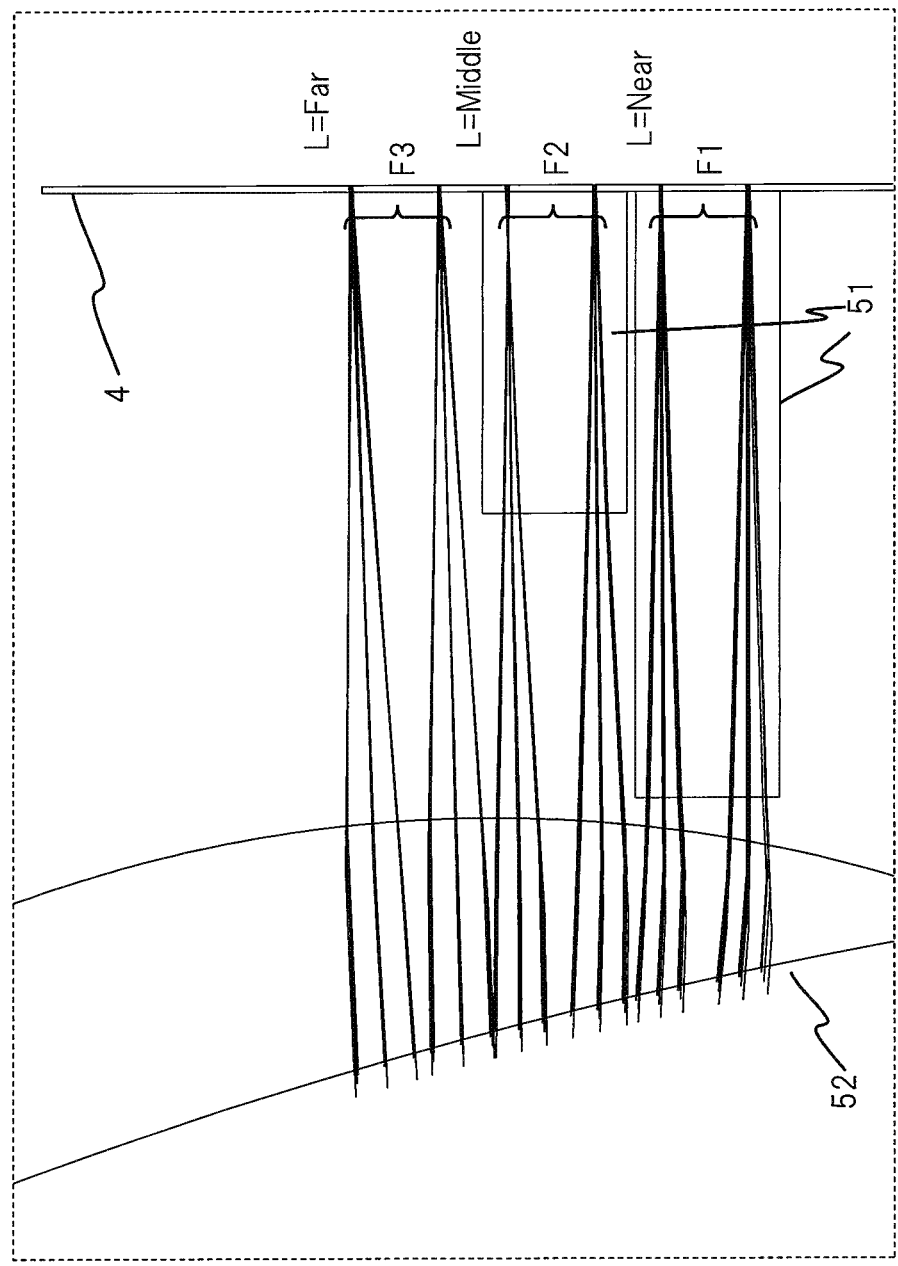
Figure 15:
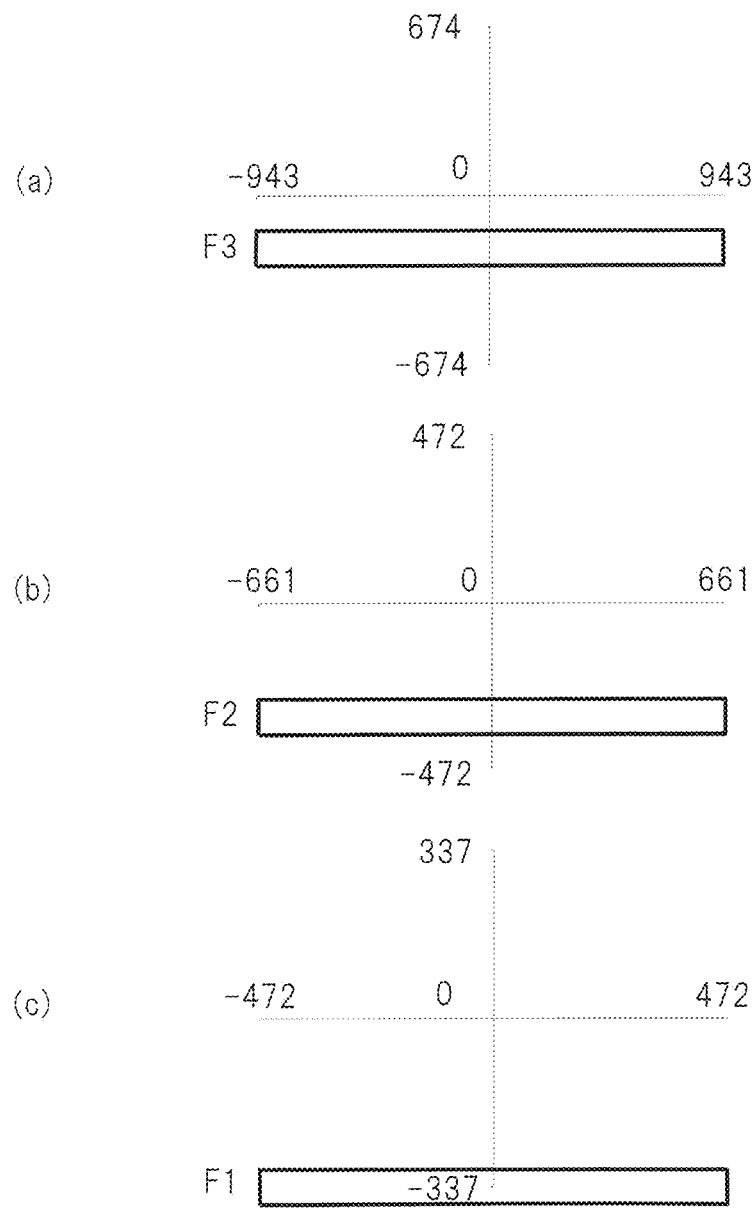
Figure 16:
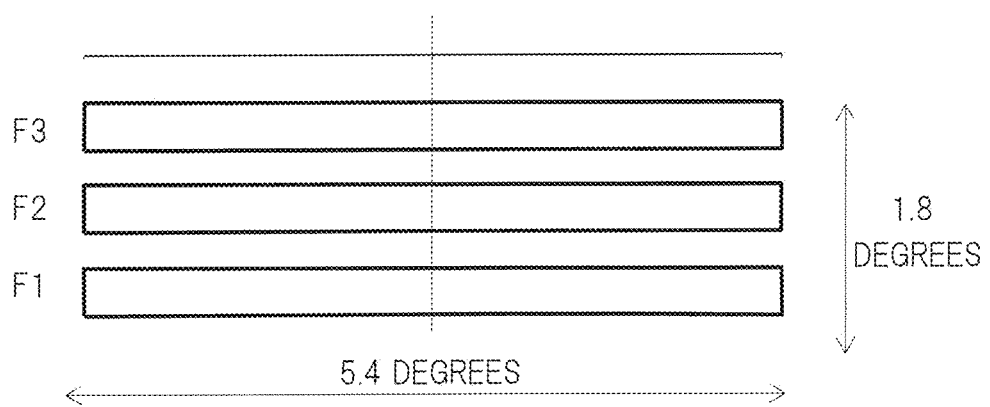
Figure 17:
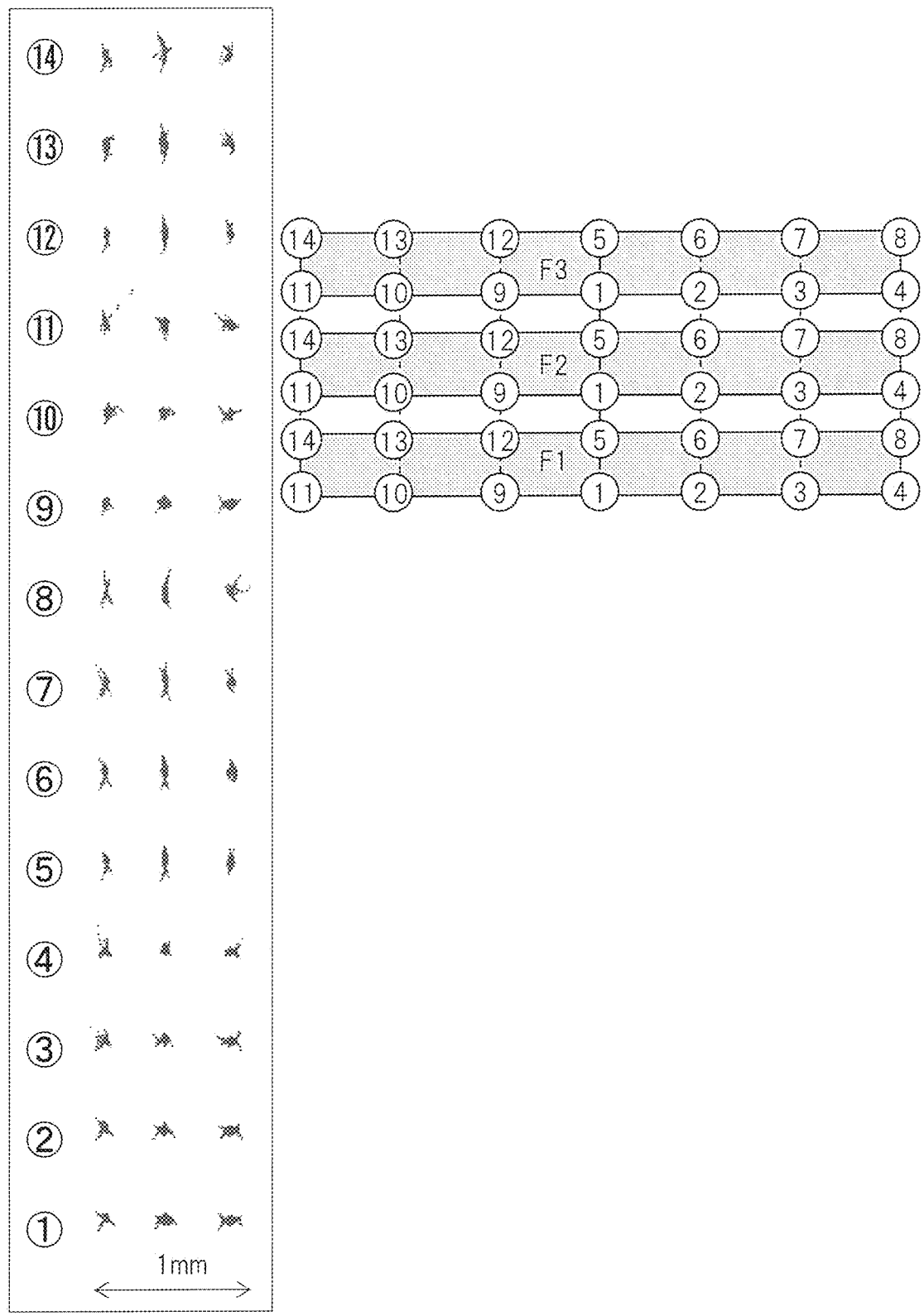
Figure 18:
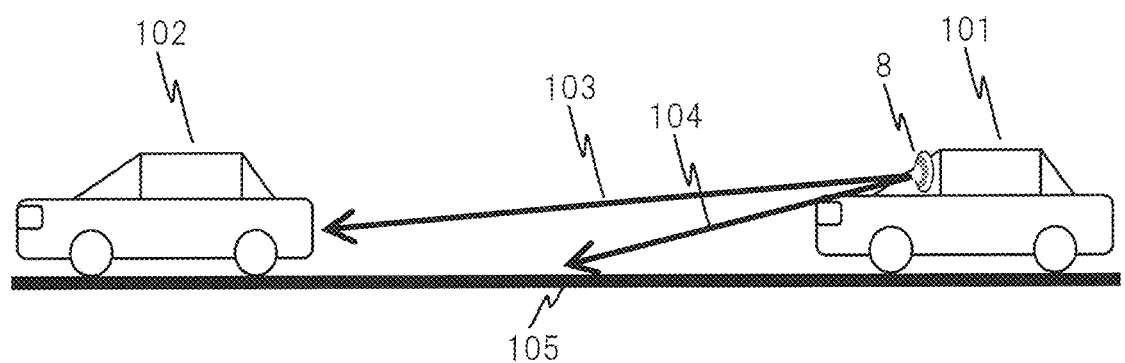
Figure 19:
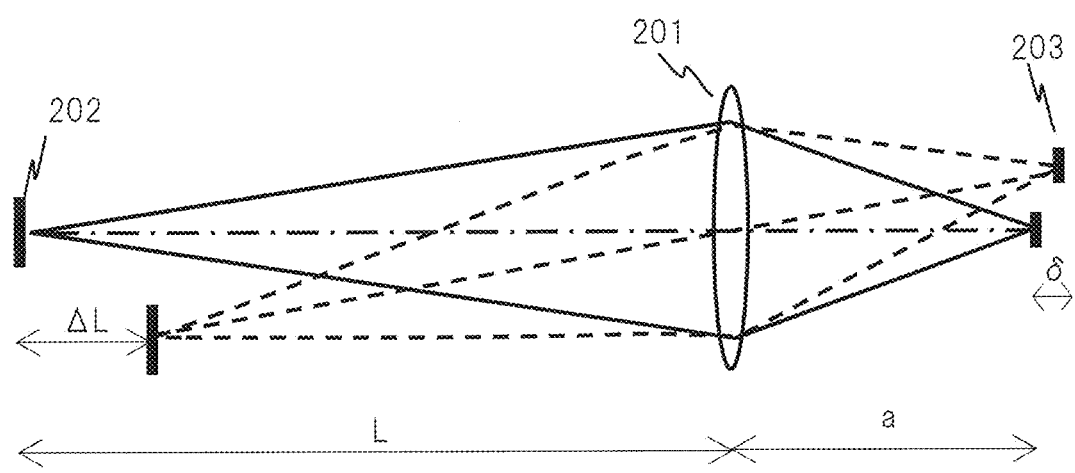
Figure 20:
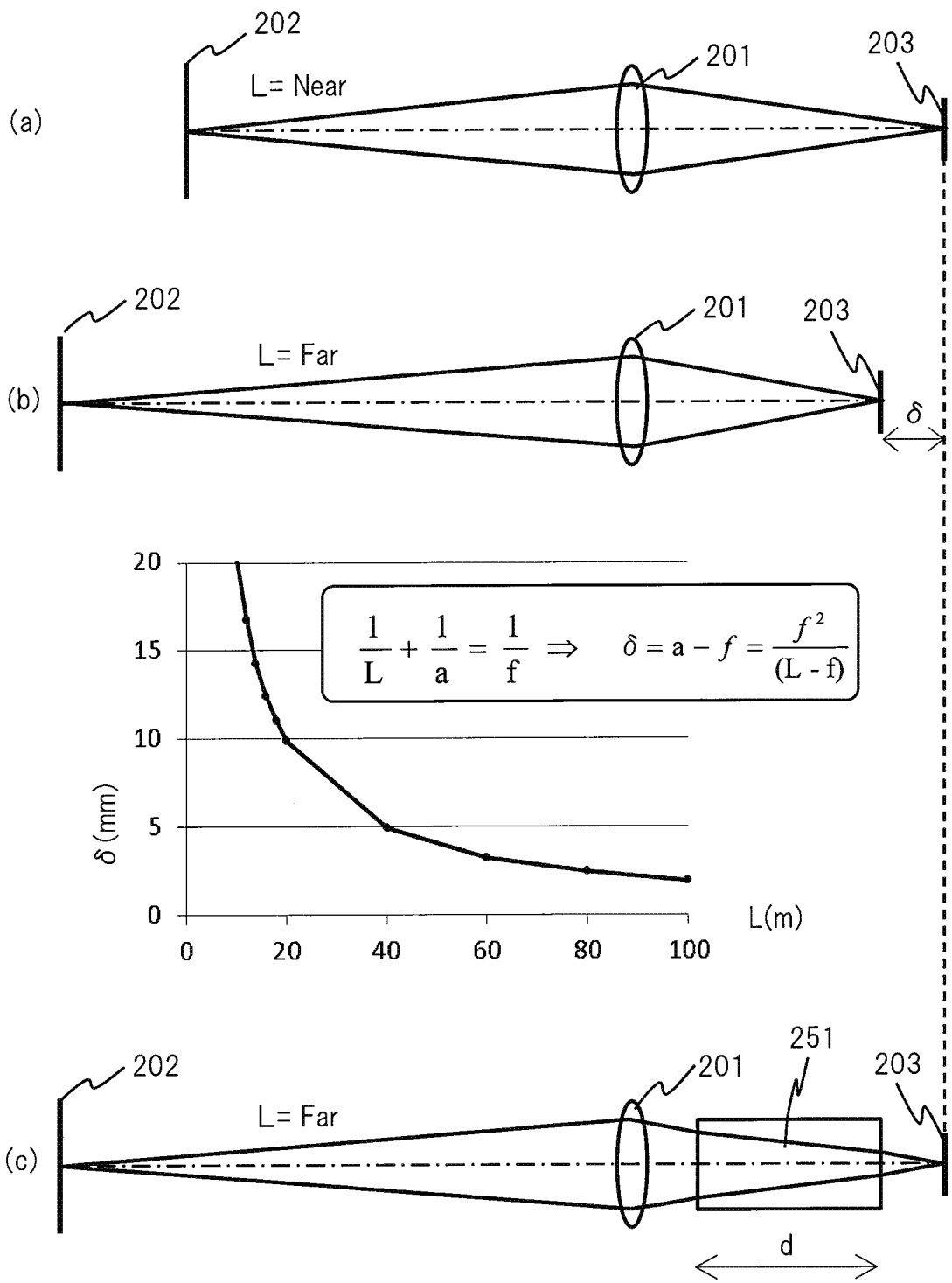
Figure 21:
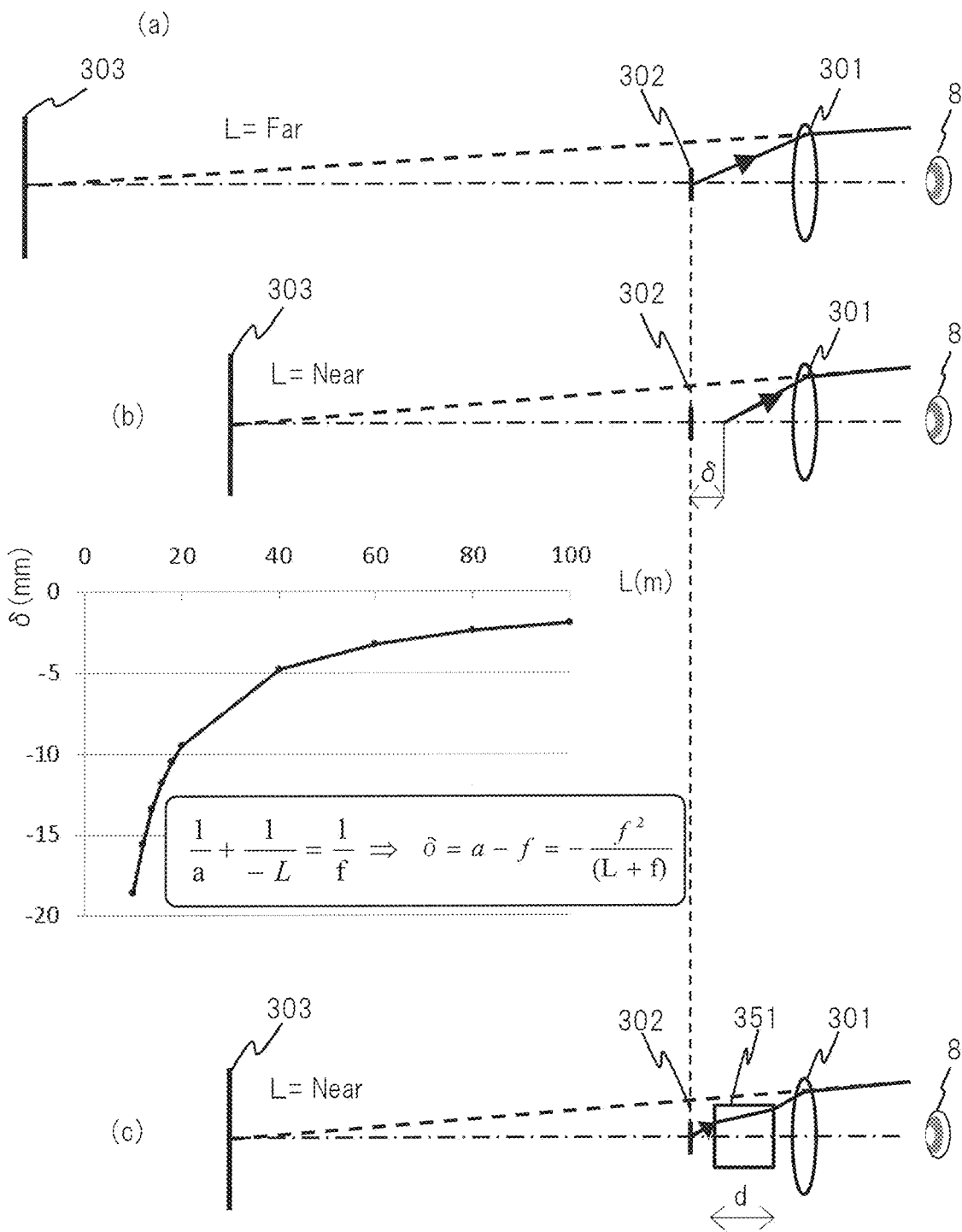

FIG. 11 is an entire ray diagram of a virtual image optical system according to a first embodiment of the present invention, where FIG. 11 (*a*) illustrates how video image information about a virtual image plane on a YZ plane is viewed with eyes of an observer, and FIG. 11 (*b*) illustrates how video image information about a virtual image plane on an XZ plane is viewed with the eyes of the observer;

FIG. 12 is a perspectively enlarged view of a principal part of a virtual image optical system according to a first embodiment of the present invention;

FIG. 13 is a perspectively enlarged view of a lens portion of an eyepiece optical system constituting the virtual image optical system according to the first embodiment of the present invention;

FIG. 14 is a diagram for explaining a mapping relationship on an inclined plane in the first embodiment of the present invention;

FIG. 15 is a diagram illustrating distortion performance for each separate optical path in the first embodiment of the present invention;

FIG. 16 is a diagram illustrating distortion performance of an entire eyepiece optical system in the first embodiment of the present invention;

FIG. 17 is a spot diagram of the eyepiece optical system in the first embodiment of the present invention;

FIG. 18 is a diagram for explaining visual field directions of a driver and a difference therebetween in distance in a conventional technique;

FIG. 19 is a diagram for explaining a mapping relationship by an object distance and an image distance;

FIG. 20 is a diagram for explaining a mapping relationship in an actual image optical system and an operation of a stepped filter; and FIG. 21 is a diagram for explaining a mapping relationship in a virtual image optical system and an operation of a stepped filter.

DETAILED DESCRIPTION OF PREFERRED EMBODIMENTS

Hereinafter, one embodiment and various kinds of aspects of the present invention will be described in detail with reference to the accompanying drawings. Note that the following description shows specific examples each having contents of the present invention, and the present invention is not limited to those. Various modifications and alterations can be made by those skilled in the art within a range of a technical idea disclosed in the present specification. Additionally, components having the same function are denoted by the same reference characters throughout the drawings for describing the embodiments, and the repetitive description thereof will be omitted in some cases.

<Embodiment of Information Display Apparatus>

Figure 1:
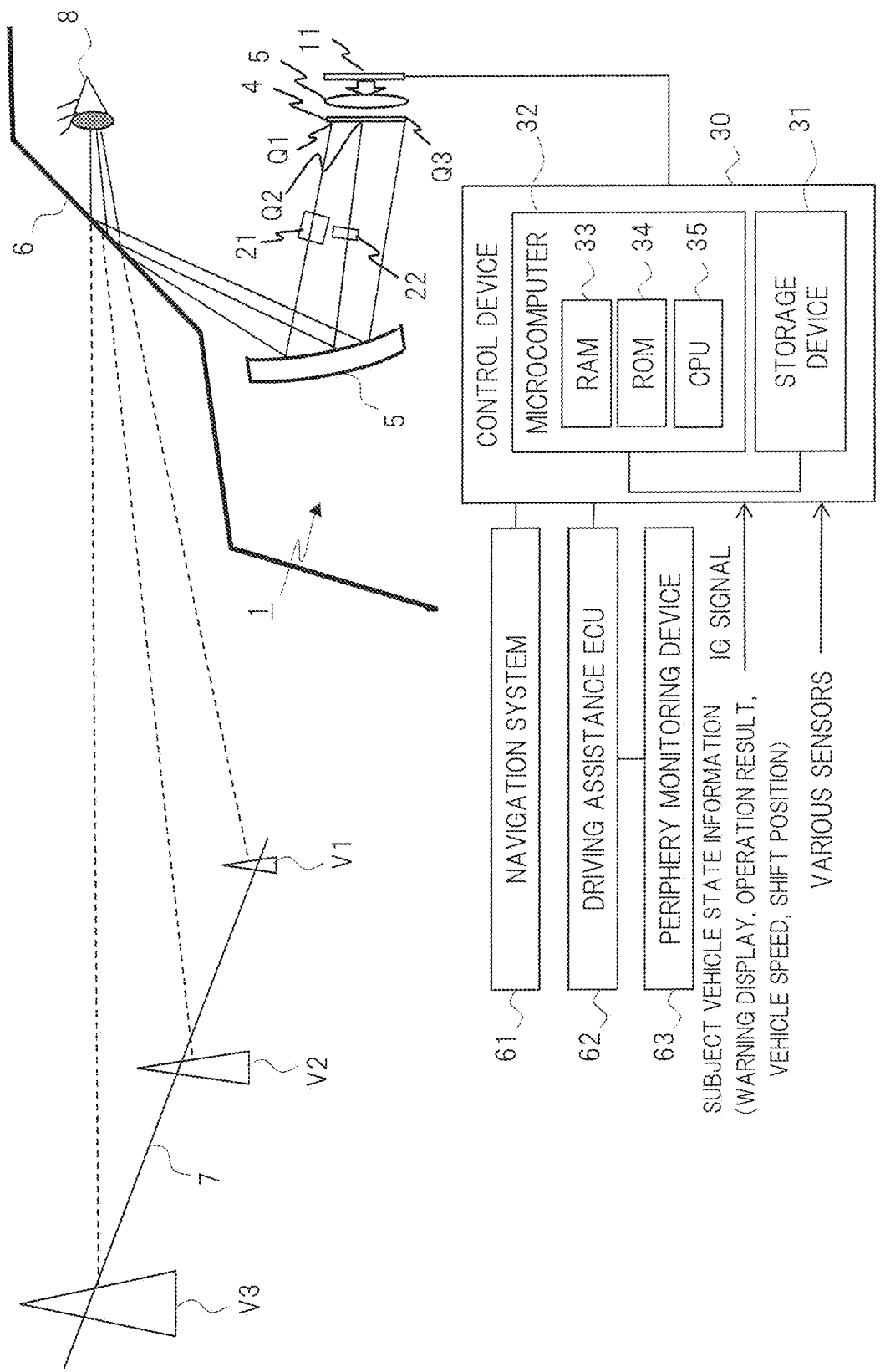
FIG. 1 is a schematic configuration diagram illustrating schematic configurations of an information display apparatus according to one embodiment of the present invention and peripheral devices arranged in the information display apparatus.

FIG. 1 is block and schematic configuration diagrams illustrating a peripheral device configuration of an information display apparatus 1 according to one embodiment of the present invention. An information display apparatus, which projects an image(s) onto a windshield of an automobile, will be particularly described here as one example.

This information display apparatus 1 is an apparatus (a so-called HUD (Headup Display)) which displays, as virtual images V1, various pieces of information reflected on a projected member (a windshield in the present embodiment) in order to form respective virtual images V1 to V3 at a plurality of positions ahead of a driver's own vehicle on a sight line 8 of a driver. Note that the projected member 6 may be a member onto which information is to be projected, and may be not only the above-described windshield but also a combiner besides. That is, the information apparatus 1 according to the present embodiment forms the respective virtual images at the plurality of positions ahead of the own vehicle on the sight line 8 of the driver, and causes the driver to visually recognize them. Examples of information to be displayed as the virtual image(s) include vehicle information and foreground information shot by a camera (not illustrated) such as a monitoring camera or an around viewer.

Additionally, the information display apparatus 1 includes: a video image projection device 11 which projects video image light for displaying information, an intermediate image forming section 4 which images the light projected from the video image projection device 11; an optical component 5 which converges or disperses video image information (video image light) imaged by the intermediate image forming section 4; and a control device 40 which controls the video image projection device 11. Note that the above-described optical component 5 is a virtual image optical system described below, and includes a concave mirror which causes light to be reflected. Additionally, the light reflected on the optical component 5 is reflected on the projected member 6 and directed toward the sight line 8 (EyeBox: described in detail below) of the driver.

The above-described intermediate image forming (or intermediate image display) section 4 has a function of imaging light projected from the video image projection device 11, and is composed of, for example, a microlens array in which microlenses are arranged in a two-dimensional shape. In the present embodiment, an optical element 21 and an optical element 22 are arranged between the intermediate image forming section 4 and the optical component 5 composed of the above-described concave reflecting mirror forming an eyepiece optical system. An arrangement of the optical element 21 and the optical element 22 is made, as a first aim, to set a formation position of a virtual image to a plurality of sites (three sites in the present embodiment) ahead of the own vehicle, and is made, as a second aim, to correct respective aberrations between the intermediate image forming section 4 and the optical component 5 forming the eyepiece optical system and at positions where rays of the video image light from the intermediate image forming section 4 are separated. Note that the aberration corrections by the optical elements enable a plurality of virtual images to be displayed at different magnifications by using the same visual image optical system even if the virtual images are formed at different positions.

More specifically, an aberration in a light flux forming a virtual image V1 positioned nearest is improved by the optical element 21, and an aberration in a virtual image V2 intermediately positioned is simultaneously corrected by the optical element 22. Since an aberration in a virtual image V3 formed farthest is optimally designed by an original virtual image optical system, an optical element is not provided here. However, needless to say, providing an optical element optimally designed for further improving aberration correction capability is without departing from a technical idea or range of the present invention.

Additionally, an example in which generation positions of virtual images are divided into the far virtual image V3, the intermediate virtual image V2, and the near virtual image V1, and the optical elements 21 and 22 are individually provided for each of the virtual images has been described for convenience of explanation in the present embodiment. However, the present invention is not limited to this. For example, a common optical element may be provided to change a spatial optical distance to continuously change a display position of a virtual image from a far position to a near position and to sufficiently reduce an aberration so that a position where the virtual image is continuously generated is changed. Needless to say, measures of providing the common element are without departing from the technical idea or range of the present invention.

On the other hand, a control device 30 includes a storage device 31 and a microcomputer 32. The storage device 31 is composed of a nonvolatile storage device whose storage content is rewritable. The microcomputer 32 is mainly composed of a computer including: a ROM 34 storing a processing program or data whose storage content needs to be retained even if power thereto is shut off; a RAM 33 temporarily storing a processing program or data; and a CPU 35 which performs various types of processings according to the processing program stored in the ROM 34 or the RAM 33.

Among them, the ROM 34 stores a processing program for causing a microcomputer 44 to perform an information display processing of controlling the video image projection device 11 so that various pieces of information such as vehicle information and foreground information are projected onto the projected member 6. As an acquisition source of the vehicle information or the foreground information, connected to the control device 30 are at least a navigation system 41 and an operation support electronic control unit (hereinafter referred to as an "operation support ECU") 42.

The navigation system 61 is a device in which a current position detected by a position detection device is collated with map data stored in a map data storage section and a path to a set destination is guided according to a result of the collations. The map data includes various pieces of information about a speed limit, the number of lanes, and an intersection on a road.

From the navigation system 61, the control device 30 acquires, as foreground information (i.e., information displayed ahead of the own vehicle by the above-described virtual image), information about a speed limit and the number of lanes on a road corresponding to a current position where the own vehicle is running, a scheduled movement route of the own vehicle set in the navigation system 51, and the like.

The operation support ECU 62 is a control device in which a driving system and a control system are controlled according to an obstacle detected as a monitoring result by a peripheral monitoring device 63 to realize operation support control. The operation support control includes well-known techniques such as cruise control, adaptive cruise control, pre-crush safety, and lane keeping assist.

The peripheral monitoring device 63 is a device which monitors a circumstance around the own vehicle. Examples thereof include: a camera which detects an object existing around the own vehicle based on an image obtained by shooting a periphery of the own vehicle; a search device which detects an object existing around the own vehicle based on a transmitting and receiving result of a search wave; and the like.

The control device 30 acquires, as foreground information, information (e.g., a distance to a preceding vehicle, an orientation of the preceding vehicle, a position where an obstacle or mark exists, and the like) from the operation support ECU 62. Further, inputted to the control device 30 are an ignition (IG) signal and own vehicle state information. The own vehicle state information among the information is information acquired as vehicle information. Examples of the information include, for example, warning information indicating that a remaining amount of a fuel, a temperature of cooling water, and the other in an internal-combustion engine reach abnormal states previously defined. The information also includes information about an operation result of a direction indicator, a running speed of the own vehicle, and a shift position. The above-described control device 30 is started when an ignition signal is inputted thereto. The foregoing is a description of the entire system of the information display apparatus according to the one embodiment of the present invention.

First Embodiment

Further details of the virtual image optical system. 5 and the video image projection device 11 according to the one embodiment of the present invention will be then described below.

Figure 2:
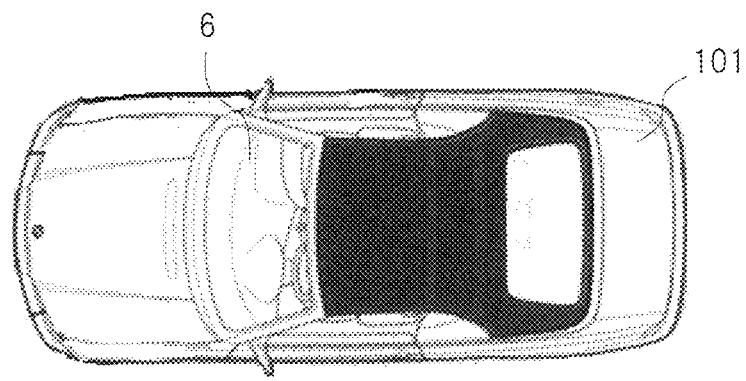
FIG. 2 is a top view of an automobile mounting the information display apparatus according to the one embodiment of the present invention.
Figure 3:
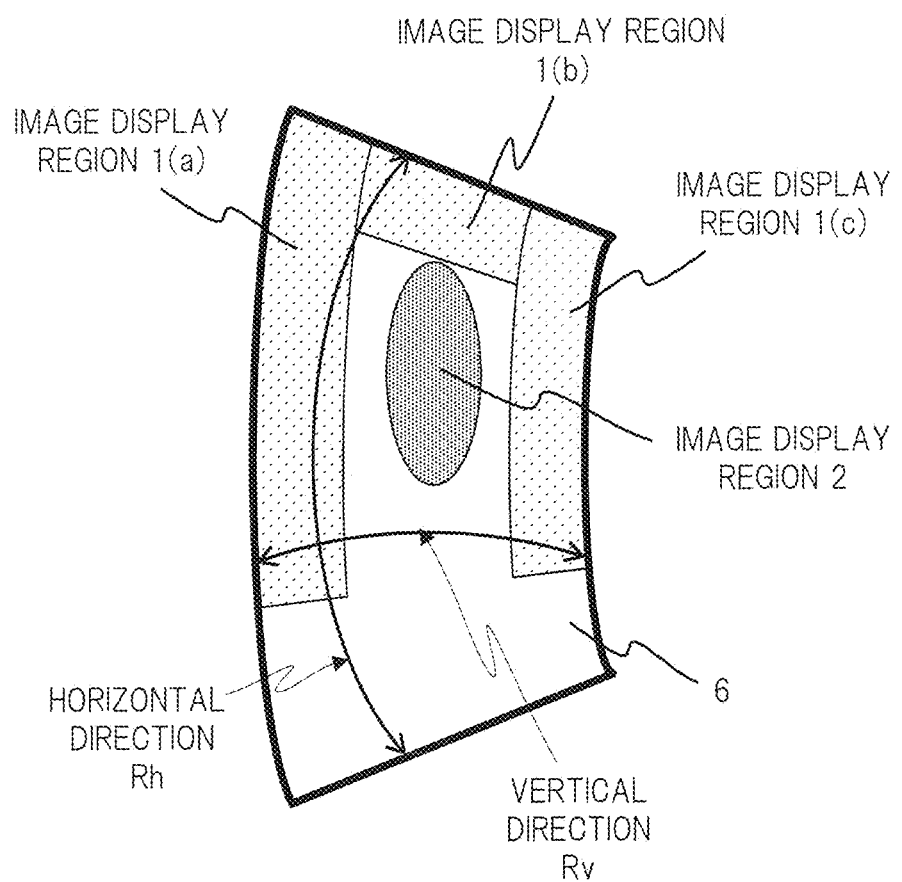
FIG. 3 is a configuration diagram illustrating a difference between curvature radii of a windshield in one embodiment of the present invention.

FIG. 2 is a top view of an automobile mounting the information display apparatus 1 according to one embodiment of the present invention. A windshield serving as the projected member 6 exists at a front of a driver's seat of an automobile body 101. Note that an inclination angle of the windshield to a vehicle body differs depending on a type of the automobile. Further, the inventors have also investigated a curvature radius of the windshield to realize an optimum virtual image optical system. As a result, curvature radii of the windshield are different in curvature radius Rh in a horizontal direction parallel to a ground plane of the automobile and a curvature radius Rv in a vertical direction orthogonal to a horizontal axis, as illustrated in FIG. 3, and it has been understood that Rh and Rv generally have the following relationship.

Rh>Rv

It has also turned out that a difference between the radii of curvature, that is, a ratio of Rh to Rv is in a range from 1.5 times to 2.5 times in many cases.

Then, the inventors have investigated commercially available products also about an inclination angle of the windshield. As a result, the inclination angle is 20 to 30 degrees in a light car or a one-box car, 30 to 40 degrees in a sedan car, and 40 degrees or more in a sports car although different depending on a vehicle type. Therefore, in the present embodiment, a virtual image optical system has been designed in consideration of: a difference between the curvature radius Rh of the windshield in the horizontal direction parallel to the ground plane of the automobile and the curvature radius Rv of the windshield in the vertical direction orthogonal to the horizontal axis; and the inclination angle of the windshield.

More specifically, the curvature radius Rh in the horizontal direction and the curvature radius Rv in the vertical direction of the windshield serving as the projected member are greatly different from each other. For this reason, an optical element, which is axially asymmetric to an optical axis (Z axis) with respect to the horizontal axis of the windshield and an axis orthogonal to the horizontal axis is provided within the virtual image optical system, and so favorable aberration correction is realized. Note that lens data obtained in the virtual image optical system will be described in detail below.

Here, as illustrated also in FIG. 1, a free-form surface lens and a first embodiment in a virtual image optical system using the free-form surface mirror will be described below, the free-form surface lens having a rotationally asymmetric shape and being capable of realizing an optical system in which respective object positions lie on the same plane with respect to a plurality of virtual image planes different in virtual field range and virtual image distance.

A configuration of the virtual image optical system according to the first embodiment of the present invention will be described with reference to FIG. 11. FIG. 11 is an entire ray diagram of the virtual image optical system 5 according to the one embodiment of the present invention illustrated in FIG. 1. Particularly, FIG. 11(a) illustrates how video image information about a virtual image plane 7 on an YZ plane is viewed with eyes of an observer, and FIG. 11 (b) illustrates how the video image information about the virtual image plane 7 on an XZ plane is viewed with the eyes of the observer. The right eye and the left eye overlap each other (see reference numeral 8) on the YZ plane, and the right eye and the left eye separately show on the XZ plane.

FIG. 12 is a perspectively enlarged view of a principal part of the above-described virtual image optical system 5 according to the first embodiment. FIG. 13 is a perspectively enlarged view of a lens portion of an eyepiece optical system 5a constituting the above-described virtual image optical system 5 according to the first embodiment. As illustrated in FIGS. 12 and 13, each of a free-form surface lens 54 and a free-form surface mirror 56 is configured by a rotationally asymmetric shape. Note that an optical element 51, a convex lens 52, and a concave lens 53 each have a large eccentricity amount (there is no eccentricity on front and rear surfaces). FIG. 14 is a diagram for explaining a mapping relationship on an inclined plane.

As illustrated also in FIG. 12, the virtual image optical system 5 is configured by arranging: a stepped filter (optical element) 51; the convex lens 52 having positive refractive power; the concave lens 53 having negative refractive power; the rotationally asymmetric free-form surface lens 54; a cylinder mirror 55; the rotationally asymmetric free-form surface mirror 56; and the windshield 6 alongside in order from the intermediate image display section (or an image display section such as a flat display) 4 side. The virtual image optical system 5 is configured so that a difference between curvature radii of the windshield 6 in a horizontal direction and a vertical direction is configured so as to be canceled by adding the cylinder mirror 55. Further, the free-form surface lens 56 rotationally asymmetric to a reflection surface corrects a distortion in a virtual image.

Here, lens data obtained in the virtual image optical system 5 according to the above-described first embodiment is illustrated by Table 1 and Table 2 described below.

TABLE 1

| Name | Plane No. | Shape | Curvature radius | Inter-plane distance | Glass material |
|---|---|---|---|---|---|
| Virtual image plane | 0-plane | Planar | ∞ | 18000·X | |
| Incident pupil | 1-plane | Planar | ∞ | −680 | |
| Windshield | 2-plane | Anamorphic aspherical | 9686 5531 | 0 | Reflection |
| Dummy plane | 3-plane | Planar | ∞ | 312.017 | |
| Mirror | 4-plane | Free-form | ∞ | 0 | Reflection |
| Dummy plane | 5-plane | Planar | ∞ | −140.110 | |
| Mirror | 6-plane | Cylindrical (Y) | −470.077 | 0.000 | Reflection |
| Dummy plane | 7-plane | | ∞ | 50.755 | |

TABLE 1-continued

| | | | | | |
|---|---|---|---|---|---|
| L1 | | 8-plane | Free-form | ∞ | 0.00348981 'PMMA25' |
| | | 9-plane | Free-form | ∞ | 45.108 |
| L2 | | 10-plane | Spherical | −40.872 | 3  BACED5_HOYA |
| | | 11-plane | Spherical | −836.157 | 5.399 |
| L3 | | 12-plane | Spherical | −261.342 | 12  EFDS1_HOYA |
| | | 13-plane | Spherical | −69.127 | −3.438 |
| Dummy plane | | 14-plane | Spherical | ∞ | 0.000·X· |
| Stepped filter | | 15-plane | Spherical | ∞ | 27.439·X·  BSC7_HOYA |
| | | 16-plane | Spherical | ∞ | 0 |
| | | 17-plane | Spherical | ∞ | 0 |
| | | 18-plane | Spherical | ∞ | 0 |
| Base material of | | 19-plane | Planar | ∞ | 0.3  58.30 |
| diffusion plate | | 20-plane | Planar | ∞ | 0  Base material PC film |
| Intermediate image | | 21-plane | Planar | ∞ | 0 |

| Name | Contents of eccentricity/tilt | Eccentricity (mm) | | Tilt (degree) | | |
|---|---|---|---|---|---|---|
| | | X axis | Y axis | Around X axis | Around Y axis | Around Z axis |
| Virtual image plane | | | | | | |
| Incident pupil | | 0 | 0 | 0 | 0 | |
| Windshield | Decenter & Return | −340 | −1959 | −43.7 | 0 | 0 |
| Dummy plane | Normal eccentricity | 0 | 0 | −130.695 | 6.321 | 0 |
| Mirror | Decenter & Return | 0 | 0 | −14.596 | −3.175 | −1.652 |
| Dummy plane | Normal eccentricity | 0 | 0 | −40.493 | −0.922 | 0 |
| Mirror | Decenter & Return | 0 | 0 | 42.550 | 2.278 | 5.284 |
| Dummy plane | Normal eccentricity | 0 | 0 | 85.587 | 23.818 | 0 |
| L1 | Normal eccentricity | 0 | 0 | −17.383 | 2.021 | −8.821 |
| | | 0 | 0 | 0 | 0 | 0 |
| L2 | Normal eccentricity | 15.906 | −22.720 | 13.162 | −9.329 | 0 |
| | | 0 | 0 | 0 | 0 | 0 |
| L3 | | 0 | 0 | 0 | 0 | 0 |
| | | 0 | 0 | 0 | 0 | 0 |
| Dummy plane | Normal eccentricity | −0.144 | −24.454 | −18.169 | −2.653 | 4.871 |
| Stepped filter | | 0 | 0 | 0 | 0 | 0 |
| | | 0 | 0 | 0 | 0 | 0 |
| | | 0 | 0 | 0 | 0 | 0 |
| | | 0 | 0 | 0 | 0 | 0 |
| Base material of | | 0 | 0 | 0 | 0 | 0 |
| diffusion plate | | 0 | 0 | 0 | 0 | 0 |
| Intermediate image | | 0 | 0 | 0 | 0 | 0 |

| | Inter-plane distance | |
|---|---|---|
| Virtual image distance | 14-plane | 15-plane |
| 18000 | 0 | 27.439 |
| 30000 | 12.883 | 14.556 |
| 100000 | 27.439 | 0 |

TABLE 2

| Code | | Mirror plane (4-plane) | L1A plane (8-plane) | L1B plane (9-plane) |
|---|---|---|---|---|
| R | 1/c | ∞ | ∞ | ∞ |
| K | K | | | |
| C2 | X | −3.22002E−02 | 4.54074E−02 | 2.55203E−02 |
| C3 | Y | −8.29603E−03 | −1.76329E−01 | −3.03864E−01 |
| C4 | $X^2$ | −1.03157E−03 | 6.07824E−03 | 7.53664E−03 |
| C5 | XY | 3.92761E−05 | 2.65621E−03 | 5.97633E−03 |
| C6 | $Y^2$ | −1.10066E−03 | −6.59897E−03 | −4.47067E−03 |
| C7 | $X^3$ | −1.91066E−08 | −2.96949E−05 | −3.45143E−05 |
| C8 | $X^2Y$ | −6.12520E−07 | −1.00245E−04 | −2.66099E−04 |
| C9 | $XY^2$ | −1.12579E−07 | −1.17043E−04 | −2.92245E−05 |
| C10 | $Y^3$ | −1.07634E−07 | 1.05709E−04 | 3.16314E−04 |
| C11 | $X^4$ | 7.89875E−10 | −5.15580E−06 | −5.61519E−06 |
| C12 | $X^3Y$ | 2.17486E−09 | 1.90246E−06 | 5.96665E−07 |
| C13 | $X^2Y^2$ | −5.36548E−10 | 4.86696E−06 | 4.13535E−06 |
| C14 | $XY^3$ | 1.33541E−09 | 4.46461E−08 | 2.77050E−08 |
| C15 | $Y^4$ | −2.13150E−09 | 5.81526E−06 | 1.61022E−05 |
| C16 | $X^5$ | 3.34679E−12 | 1.13247E−07 | 2.28361E−07 |
| C17 | $X^4Y$ | −2.94088E−12 | −2.15118E−07 | −1.45299E−07 |
| C18 | $X^3Y^2$ | 2.51633E−12 | 7.79406E−09 | −1.30621E−07 |
| C19 | $X^2Y^3$ | −3.87701E−11 | −4.44829E−08 | 7.15801E−08 |

TABLE 2-continued

| Code | | Mirror plane (4-plane) | L1A plane (8-plane) | L1B plane (9-plane) |
|---|---|---|---|---|
| C20 | $XY^4$ | 1.76966E−11 | 3.20822E−08 | 2.04991E−09 |
| C21 | $Y^5$ | −3.44091E−11 | 4.57619E−07 | 5.40985E−07 |
| C22 | $X^6$ | −1.08236E−14 | −1.69575E−09 | −5.17032E−09 |
| C23 | $X^5Y$ | −1.29734E−13 | 1.68661E−09 | 2.98111E−09 |
| C24 | $X^4Y^2$ | −8.30366E−14 | 3.04029E−09 | 7.71212E−09 |
| C25 | $X^3Y^3$ | −1.22821E−13 | 4.36565E−10 | 4.71962E−10 |
| C26 | $X^2Y^4$ | 3.14237E−13 | −1.75490E−09 | 1.90722E−09 |
| C27 | $XY^5$ | −3.73084E−13 | −3.96351E−10 | −4.46001E−10 |
| C28 | $Y^6$ | 4.52998E−13 | 7.02316E−09 | 5.00733E−09 |
| C29 | $X^7$ | −1.76226E−16 | 2.93875E−12 | 1.61555E−11 |
| C30 | $X^6Y$ | 8.25919E−16 | −4.03795E−11 | −6.76333E−11 |
| C31 | $X^5Y^2$ | 1.69287E−16 | −1.61726E−11 | −1.59265E−10 |
| C32 | $X^4Y^3$ | 2.87705E−15 | 1.20090E−10 | 6.25989E−11 |
| C33 | $X^3Y^4$ | −5.11558E−15 | 2.51934E−11 | 5.14224E−11 |
| C34 | $X^2Y^5$ | 7.93551E−15 | 2.18795E−10 | 1.94413E−10 |
| C35 | $XY^6$ | −6.87888E−15 | 1.39011E−11 | 1.45325E−11 |
| C36 | $Y^7$ | 5.89554E−15 | −6.44596E−11 | −8.56637E−11 |
| C37 | $X^8$ | | 1.47968E−12 | 1.09094E−12 |
| C38 | $X^7Y$ | | 1.81553E−12 | 3.77892E−13 |
| C39 | $X^6Y^2$ | | −3.00409E−13 | 3.05178E−12 |

TABLE 2-continued

| Code | | Mirror plane (4-plane) | L1A plane (8-plane) | L1B plane (9-plane) |
|---|---|---|---|---|
| C40 | $X^5Y^3$ | | −4.61107E−14 | −2.30189E−12 |
| C41 | $X^4Y^4$ | | 1.09241E−12 | −2.06982E−12 |
| C42 | $X^3Y^5$ | | −1.56574E−14 | −7.73312E−13 |
| C43 | $X^2Y^6$ | | 6.04551E−12 | 3.61288E−12 |
| C44 | $XY^7$ | | 1.80863E−13 | 7.39563E−14 |
| C45 | $Y^8$ | | −1.61149E−12 | −1.54184E−12 |
| C46 | $X^9$ | | −6.00019E−15 | 4.68892E−15 |
| C47 | $X^8Y$ | | 2.02853E−14 | 2.70576E−14 |
| C48 | $X^7Y^2$ | | 4.26901E−14 | 1.88520E−14 |
| C49 | $X^6Y^3$ | | 7.56454E−15 | 6.45243E−14 |
| C50 | $X^5Y^4$ | | −2.53738E−16 | 6.86799E−15 |
| C51 | $X^4Y^5$ | | 7.17209E−15 | −1.45366E−14 |
| C52 | $X^3Y^6$ | | −2.56593E−15 | −1.50111E−14 |
| C53 | $X^2Y^7$ | | 4.16227E−14 | 1.72732E−14 |
| C54 | $XY^8$ | | −2.98638E−15 | −3.57456E−15 |
| C55 | $Y^9$ | | −2.60489E−15 | −3.35263E−15 |

Figure 6:
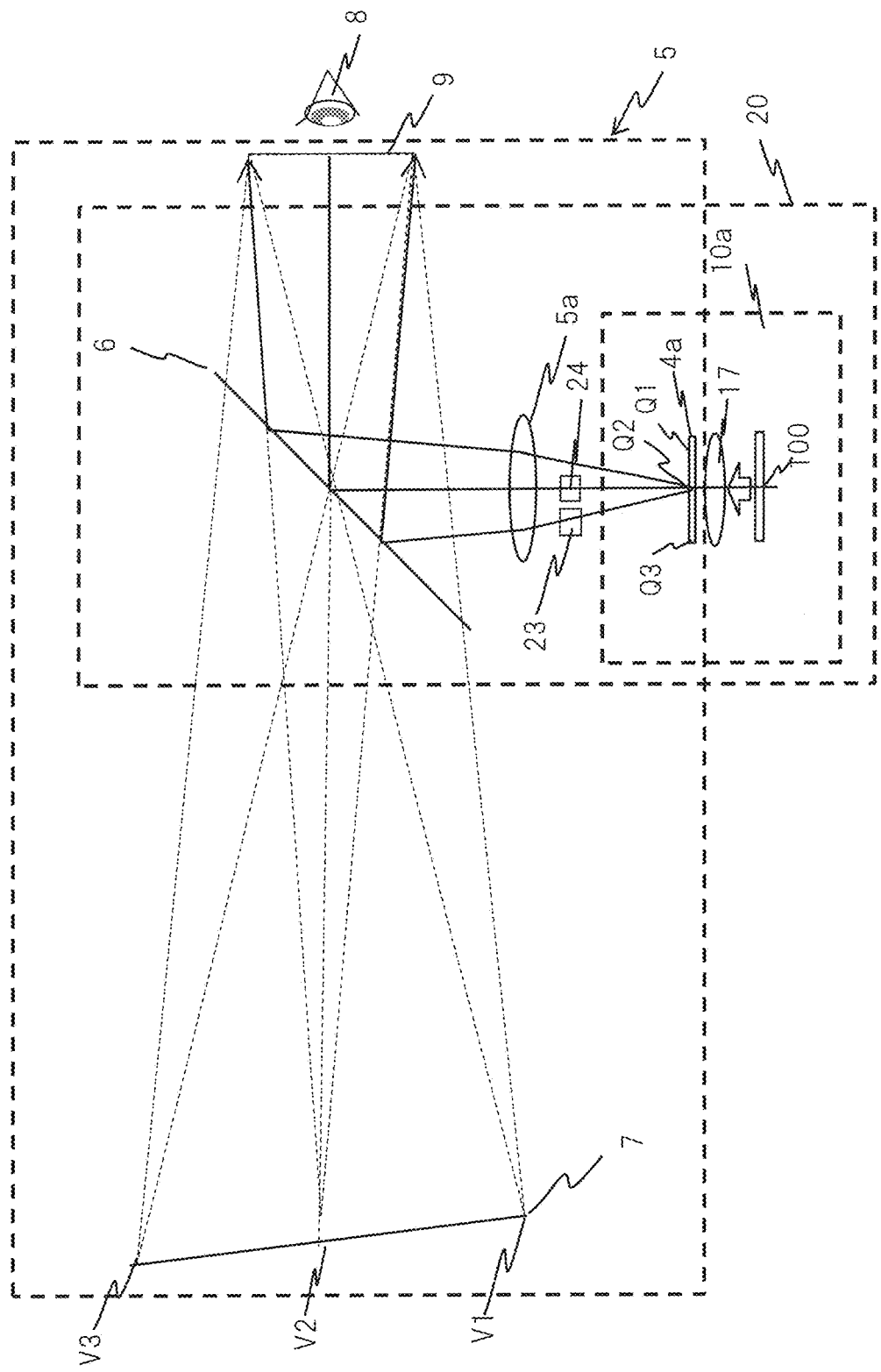
FIG. 6 is a schematic configuration diagram illustrating an example of the virtual image optical system in the information display apparatus according to one embodiment of the present invention.

Table 1 is a table illustrating lens data of the video image projection device 11 according to the first embodiment of the present invention. In the lens data illustrated in Table 1, a curvature radius is represented by a plus sign when a center position of the curvature radius is in a travelling direction, and an inter-surface distance represents a distance on an optical axis from a vertex position of each surface to a vertex position of a subsequent surface thereto. For example, a thickness of a stepped filter corresponding to the optical element 23 illustrated in FIG. 6 is 27.439 mm when a virtual image distance is 18 m; a thickness of a stepped filter corresponding to the optical element 24 illustrated in FIG. 6 is 14.556 mm when the virtual image distance is 30 m; and the thickness of the stepped filter is 0 mm when the virtual image distance is 100 m.

Additionally, an eccentricity is a value in a Y-axis direction, a slant is a rotation around an X-axis within an YZ plane, and the eccentricity and slant act in this order on a corresponding surface. At a "normal eccentricity", a subsequent surface is arranged at a position having an inter-surface distance on a new coordinate system on which the eccentricity and slant have acted. The eccentricity and slant for "decenter and return" act on only the surface, and do not affect the subsequent surface.

PMMA in a glass material name is plastic acrylate (Polymethyl methacrylate), and 58.3 in the glass material name represents a material having a refractive index of 1.58 and having an Abbe's number of 30.

Table 2 is a diagram of a free-form surface coefficient about the lens data of the video image projection device 11 according to the first embodiment of the present invention. The free-form surface coefficient in Table 2 is found by the following equation (equation 1).

$$Z = \frac{c \cdot (x^2 + y^2)}{1 + \sqrt{1 - (1+K)c^2 \cdot (x^2 + y^2)}} + \sum\sum (Cj(m,n) \times x^m \times y^n)$$ [Equation 1]

A free-form surface coefficient Cj has a rotationally asymmetric shape with respect to each optical axis (Z axis), and has a shape defined by a component of a conic term and a component of a term in a polynomial about X and Y. For example, the coefficient of C19 satisfying j={(2+3)2+2+3×3}/2+1=19 corresponds to a case where X is quadratic (m=2) and Y is cubic (n=3). Additionally, a position of each optical axis of a free-form surface is determined depending on respective amounts of eccentricity and slant at the lens data illustrated in Table 1.

Further, an anamorphic aspheric coefficient of the video image projection device 11 according to the first embodiment of the present invention is found by the following equation (equation 2). In the (equation 2), cuy (=1/rdy) and cux (=1/rdx) respectively have "rdy=9686 mm" and "rdx=5531 mm" in Table 1, and all other coefficients are zero.

$$Z = \frac{cux \cdot x^2 + cuy \cdot y^2}{1 + \sqrt{1 - (1+Kx)cux^2 \cdot x^2 - (1+Ky)cuy^2 \cdot y^2}}$$ [Equation 2]

Moreover, respective values of an eyebox size, a visual field angle, and the like in the eyepiece optical system constituting the virtual image optical system 5 according to the first embodiment of the present invention are illustrated in this order of the horizontal direction and the vertical direction.

Eyebox size 100×50 mm

Effective size of video image light on screen plate 40.70× 18.80 mm

Visual field angle (a total angle of view) 5.4×1.8 degrees

Separate optical path (vertical visual-field direction, virtual image size, virtual image distance)

1.8~2.2 degrees, 1698×126 mm, 18 m
1.1~1.5 degrees, 2830×210 mm, 30 m
0.4~0.8 degrees, 9432×698 mm, 100 m Next, optical performance, particularly, distortion performance of the virtual image optical system 5 according to the above-described first embodiment will be described below with reference to FIGS. 15 to 17.

FIGS. 15 and 16 are diagrams each illustrating distortion performance of the virtual image optical system 5 in the video image projection device 11 according to the first embodiment of the present invention. FIG. 17 is a spot diagram of an eyepiece optical system in the video image projection device 11 according to the first embodiment of the present invention.

FIG. 15 is a diagram illustrating distortion performance for each separate optical path of the first embodiment on virtual image planes 71, 72, and 73 illustrated in FIG. 11 described above, and it is understood from this drawing that a virtual image having a rectangular shape is realized on each of the virtual image planes. When a visual field angle is calculated from the size of the virtual image on each of the virtual image planes 71, 72, and 73, a horizontal-directional visual-field angle (a total angle of view) in a visual field range F1 is 2×tan (1698/2/18000)=5.4 degrees; a horizontal-directional visual-field angle (a total angle of view) of a visual field range F2 is 2×tan (2830/2/30000)=5.4 degrees; and a horizontal-directional visual-field angle (a total angle of view) of a visual field range F3 is 2×tan (9432/2/100000) =5.4 degrees. Since the respective visual field angles in the horizontal direction on the virtual image planes 71, 72, and 73 have the same value, the respective visual field ranges on the virtual image planes 71, 72, and 73 are collectively represented in FIG. 16. However, it is understood that the visual field ranges F1, F2, and F3 are respectively displayed at positions which are shifted from one another in the vertical direction.

FIG. 17 is a spot diagram obtained by arranging object points on the respective virtual image planes 71, 72, and 73 and calculating a spot diagram on the screen plate 4, and this realizes favorable optical performance. Note that the spot diagram is a spot diagram in the entire light flux in which an eyebox 9 has a size of 100 mm in a horizontal direction×50 mm in a vertical direction; and a spot diagram in a case of the irises of the eyes of a person (which is said to be φ7 mm at the maximum) is more significantly improved than that in FIG. 17 in a case of a virtual image viewed by an actual driver.

Therefore, according to the present embodiment, the information display apparatus capable of simultaneously displaying the virtual images in different visual field directions at different virtual image distances can be provided by the virtual image optical system using the free-form surface lens and the free-form surface mirror.

While driving, a driver generally makes: confirmation of a forward running car (lighting of a brake lamp or a right-turn/left-turn lamp); confirmation of a road surface of a road immediately in front of the forward running car (e.g., presence or absence etc. of a falling object(s)); further confirmation of a bicycle(s) and a pedestrian(s) at an end of the road immediately in front of the forward running car; and the like, as illustrated in FIGS. 20(a) to 20(C). According to the present embodiment, it becomes possible to perform display such as display of attention attraction information about the forward running car in the virtual image range corresponding to the position of the forward running car and display of the existence of the falling object in the corresponding virtual image range and at the position of the road surface of the road immediately in front of the forward running car. Further, according to the present embodiment, the video images can be simultaneously displayed on a plurality of virtual image planes that have the different virtual image distances and are positioned in the different visual field directions.

Additionally, since the driver also confirms information about a speed meter, a fuel gauge, and the like, equipping with the information display apparatus causes information about various types of meters and gauges to be displayed as a virtual image(s) ahead of the driver. Therefore, movement of the driver in a sight line direction is reduced, and a time period taken to focus the eyes can be also shortened, which makes it possible to improve safety of the driving.

Meanwhile, distances from the driver to the forward running car in the foreground, the road surface immediately in front of the forward funning car, and further the bicycle and the pedestrian at the end of the road immediately in front of the forward running car are different from each other and so, by changing the distance of the virtual image indicating the information related thereto, the time period taken to focus the eyes can be further shortened, which makes it possible to further improve the safety of the driving.

Then, a mapping relationship due to a difference between the virtual image distances by the information display apparatus is arranged with reference to FIGS. 19 to 21 and quantitatively presents the problems to be solved.

FIG. 19 is a diagram for explaining a mapping relationship (in a real image optical system) by an object distance and an image distance. When a distance L from an imaging lens 201 to an object plane 202 decreases, a distance a to an image plane 203 increases. FIG. 20 is a diagram for explaining the mapping relationship in the real image optical system and an operation of a stepped filter, and indicates a movement amount δ at a focal position having a focal length=440 mm and an object distance L=100 to 10 m. In the real image optical system, a focal position on a short distance side is farther apart than a focal position on a long distance side. Here, when a filter 251 having a thickness d and a refractive index N is arranged between the imaging lens 201 and the real image plane 203, a position of the real image plane 203 can be separated by an amount corresponding to d (1−1/N) serving as a difference between a physical length d of the filter 251 and an optical length d/N. In the real image optical system, a real image plane position on the short distance side is farther apart from a real image plane position on the long distance side and so, by arranging the filter 251 between the imaging lens 201 and the real image plane 203 on an optical path on the long distance side, a physical real image plane position on the short distance side and a physical real image plane position on the long distance side can be arranged on the same plane.

Similarly, FIG. 21 is a diagram for explaining a mapping relationship in a virtual image optical system and an operation of a stepped filter, and indicates a movement amount δ at an object position having a focal length=440 mm and a virtual image distance L=100 to 10 m. In the virtual image optical system, an object position on the long distance side is farther apart from an object position on the short distance side. Similarly, when a filter 351 having a thickness d and a refractive index N is arranged between an eyepiece lens 301 and an object plane 302, a position of the object plane 203 can be separated by an amount corresponding to d (1−1/N) serving as a difference between a physical length d of the stepped filter 351 and an optical length d/N. In the virtual image optical system, an object plane position on the long distance side is farther apart from an object plane position on the short distance side and so, by arranging the filter 351 between the eyepiece lens 301 and the object plane 302 on an optical path on the short distance side, a physical object plane position on the short distance side and a physical object position on the long distance side can be arranged on the same plane. When the virtual image distance L=20 to 10 m, for example, the position of the object plane 302 is shifted by δ=9.1 mm, so that the filter 351 satisfying d=δ/(1−1/N)=26.6 mm is required. Similarly, when the virtual image distance L=100 to 18 m, the position of the object plane 302 is shifted by δ=8.6 mm, so that the filter 351 satisfying d=25.2 mm is required.

Second Embodiment

A basic structure of an optical system in an information display apparatus according to a second embodiment of the present invention will be described with reference to FIG. 5. The optical system illustrated in FIG. 5 includes a forming unit 10 and an eyepiece optical system 5a constituting the above-described virtual image optical system 5. That is, the optical system has a configuration in which video image light emitted from the projection optical system 20 is reflected on the windshield 6 of an automobile (not illustrated) and is thus incident on the eyes 8 of the driver.

More specifically, a light flux irradiated onto a liquid crystal display panel 2 from a backlight 100 is incident on a relay optical system 3 as a video image light flux including video image information displayed on a liquid crystal display panel 4a. By an imaging action in the relay optical system 3, the video image information on the liquid crystal display panel 2 is enlarged, and is then enlarged and projected onto an intermediate image forming section 4. Points P1, P2, and P3 on the liquid crystal display panel respectively correspond to points Q1, Q2, and Q3 on the intermediate image forming section 4. When the relay optical system 3 is used, a liquid crystal display panel having a small display size can be used. The backlight 100, the liquid crystal display panel 2, the relay optical system 3, and the intermediate image forming section 4 form image information (video image information) on the intermediate image forming section 4, and so are generically referred to as the image forming unit 10.

Then, the image information on the intermediate image forming section 4 is projected onto the windshield 6 by the eyepiece optical system 5a, and a light flux reflected on the windshield 6 reaches a position of the eyes 8 of an observer. As viewed from the eyes of the observer, since such a relationship is held that the observer is viewing the image information on the virtual image plane 7. The points Q1, Q2, and Q3 on the intermediate image forming section 4 respectively correspond to points V1, V2, and V3 on the virtual image plane 7. Note that a range in which the points V1, V2, and V3 on the virtual image plane 7 can be viewed also by moving the position of the eyes 8 is a so-called eyebox 9. Thus, the virtual image optical system according to the present invention is an optical system capable of displaying an object (spatial image) and an image (virtual image) in front of the eyes of the observer similarly to an eyepiece lens in a finder of a camera or an eyepiece lens in a microscope.

Additionally, the intermediate image forming section 4 is composed of a microlens array in which microlenses are arranged in a two-dimensional shape. That is, by its diffusion action, a divergent angle of a light flux emitted from the intermediate image forming section 4 increases, which makes a size of the eyebox 9 a predetermined size. Note that the diffusion action of the intermediate image forming section 4 can be realized also by containing diffuse particles.

Figure 5:
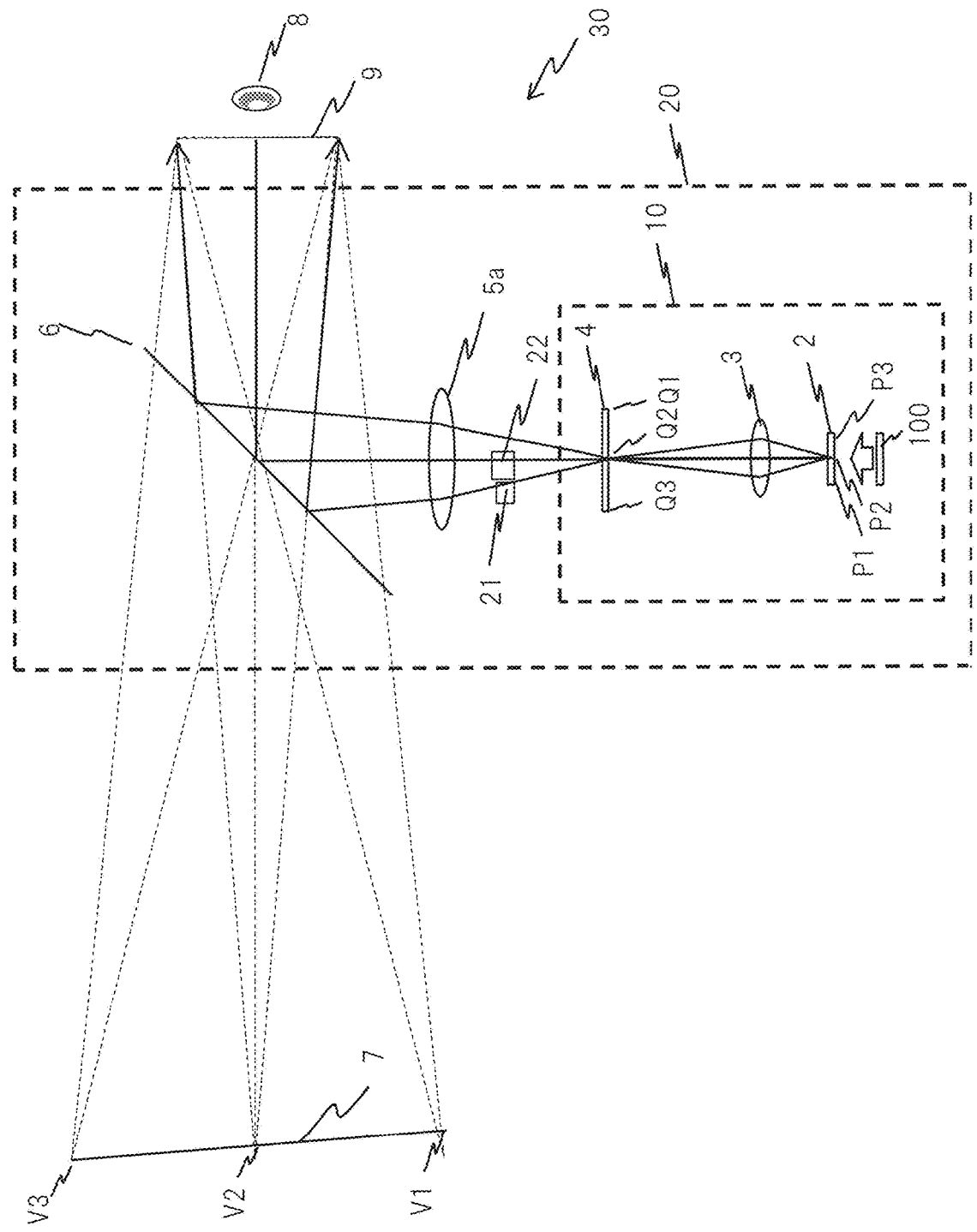
FIG. 5 is a schematic configuration diagram illustrating a virtual image optical system in the information display apparatus according to one embodiment of the present invention.

Further, as illustrated by FIG. 5 in the second embodiment of the present invention, an aberration-correction optical element is arranged between the intermediate image forming section 4 and the eyepiece optical system 5a constituting the virtual image optical system 5 so as to correspond to a generation position of a virtual image. More specifically, a correction optical element 21 is arranged at a position through which a light flux corresponding to the nearest position V1 passes, and is caused to approach at the virtual image generation position in the virtual image optical system 5, thereby achieving a low magnification of the virtual image, and concurrently reducing a distortion and an aberration occurring in the virtual image. Then, a correction optical element 22 is arranged at a position through which a light flux corresponding to a virtual image V2 established at an intermediate position passes, and is caused to make the virtual image generation position in the virtual image optical system 5 established at the intermediate position, thereby achieving a middle magnification of the virtual image, and concurrently reducing the distortion and the aberration occurring in the virtual image. That is, the eyepiece optical system 5a constituting the virtual image optical system 5 is optimally designed so that the above-described correction optical element may do without being arranged at a position through which a light flux corresponding to a virtual image V3 established farthest from a monitoring person passes.

Like this, the eyepiece optical system 5a is optimally designed for the farthest established virtual image V3 to be a reference while the correction optical elements are respectively arranged for the virtual image V2 established at an intermediate distance and the virtual image V1 established near. Therefore, the eyepiece optical system becomes an optimum structure for not only reducing an optical distance between the intermediate image forming section 4 and the eyepiece optical system 5a but also correcting the distortions and the aberrations in the virtual images established at the respective image positions.

Additionally, to reduce the distortions and the aberrations in the virtual images, a plurality of intermediate image forming sections may be used (a similar effect is obtained by division), and may be respectively arranged at optimum positions for the eyepiece optical system 5a by being matched with positions of the virtual images. In the case, if a direction of the intermediate image forming section is directed in a direction incident on a pupil from the eyepiece optical system 5a, video image light can be more efficiently incident on the eyepiece optical system 5a.

The present embodiment has been described as an embodiment, which corrects the distortions and the aberrations of the virtual images, by arranging the correction optical systems at the positions (positions between the eyepiece optical system and a flat display in FIGS. 5 and 6) on which the light flux corresponding to the virtual image V1 established near, the light flux corresponding to the virtual image V2 established intermediately, and the light flux corresponding to the virtual image V3 established far are incident on the virtual image system 5 by division, the correction optical systems corresponding to the respective virtual images. However, the present invention is not limited to only this. Even if the positions where the virtual images are established are continuous from a far position to a near position, for example, the correction optical elements may be arranged by changing the optical distance between the virtual image optical system 5 and the intermediate image forming section 4 so as to correspond to the respective establishment positions of the virtual images. It is needless to say that this does not depart from the technical idea or range of the present invention.

Third Embodiment

An optical system in an information display apparatus according to a third embodiment of the present invention will be described below with reference to FIG. 6.

In an example illustrated in this drawing, a flat display (e.g., a liquid crystal display panel) 4a is used as a video image source. A light flux irradiated from a backlight 100 is incident on an eyepiece optical system 5a, which constitutes a virtual image optical system 5, as a video image light flux including video image information displayed on the liquid crystal display panel 4a. An aberration-correction optical element is arranged between the liquid crystal display panel 4a and the eyepiece optical system 5a constituting the virtual image optical system 5 so as to correspond to a generation position of a virtual image similarly to the above-described second embodiment. More specifically, a correction optical element 23 is arranged at a position, through which a light flux corresponding to V1 positioned nearest passes, and causes the virtual image generation position in the virtual image optical system 5 to approach a near position and concurrently causes a distortion and an aberration occurring in the virtual image to be reduced. Then, a correction optical element 24 is arranged at a position, through which a light flux corresponding to a virtual image V2 established at an intermediate position passes, and causes the virtual image generation position in the virtual image optical system 5 to be established at the intermediate position, thereby achieving a middle magnification of the virtual image, and concurrently reducing the distortion and the aberration occurring in the virtual image. On the other hand, the eyepiece optical system 5a constituting the virtual image optical system 5 is optimally designed so that a correction optical element may do without being arranged at a position through which a light flux corresponding to a virtual image V3 established farthest from a monitoring person passes.

Also in the third embodiment, the virtual image optical system 5 is optimally designed for the virtual image V3 established farthest from the monitoring person so as to serve as a design standard of the virtual image optical system 5, and the correction optical elements are respectively arranged for V2 established at an intermediate distance and V1 established near similarly to the above-described second embodiment. From this reason, an optical distance between the flat display 4a and the eyepiece optical system 5a can be matched with the correction optical elements, and so the third embodiment becomes the optimum structure for correcting the distortions and the aberrations in the virtual images established at the respective positions.

Figure 7:
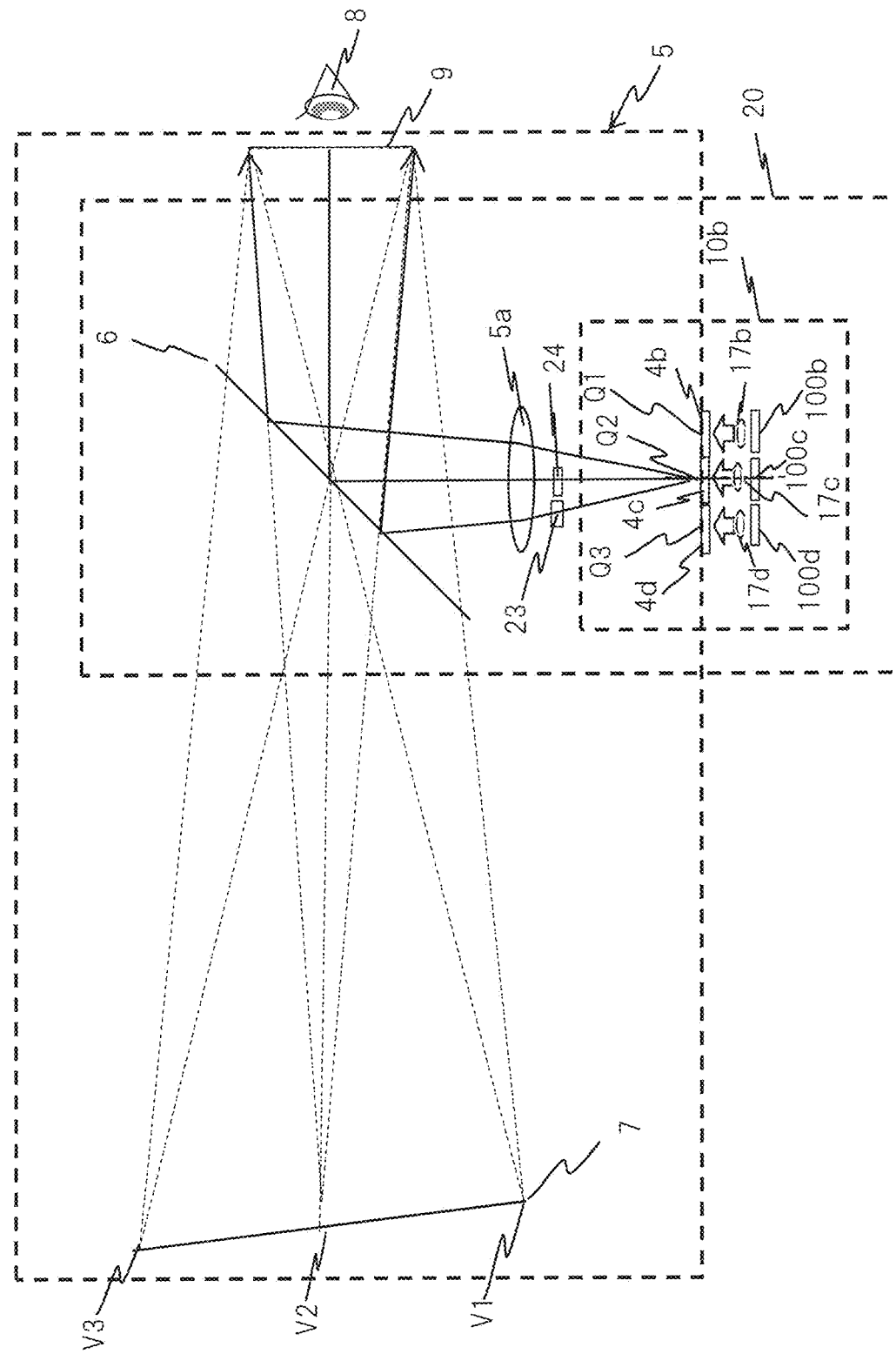
FIG. 7 is a schematic configuration diagram illustrating an example of the virtual image optical system in the information display apparatus according to one embodiment of the present invention.

FIG. 7 illustrates an example in which a plurality of flat displays (e.g., liquid crystal display panels) 4b, 4c, and 4d are each used as a video image source. Light fluxes irradiated from backlights 100b, 100c, and 100d are incident on a virtual image optical system 5a as video image light fluxes including video image information displayed on the liquid crystal display panels 4b, 4c, and 4d. Actions of the virtual optical system 5a and the correction optical elements corresponding to the respective virtual images V3, V2, and V1 are similar to those in the second embodiment illustrated in FIG. 6 described above, and description thereof is omitted herein.

Figure 8:
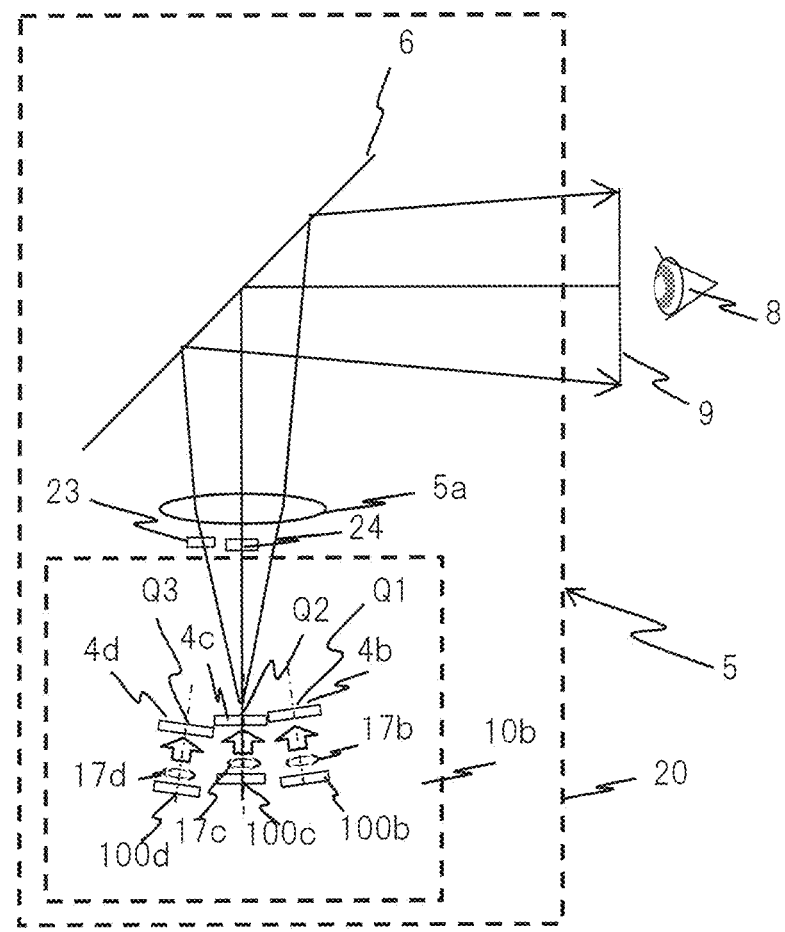
FIG. 8 is a schematic configuration diagram illustrating an example of the virtual image optical system in the information display apparatus according to one embodiment of the present invention.

FIG. 8 illustrates another example in which a plurality of flat displays (e.g., liquid crystal display panels) 4b, 4c, and 4d are each used as a video image source. Also herein, light fluxes irradiated from, backlights 100b, 100c, and 100d are incident on an eyepiece optical system 5a as video image light fluxes including video image information displayed on the liquid crystal display panels 4b, 4c, and 4d. Note that, as can be viewed from the drawing in this example, video image light can be more efficiently accepted by tilting the flat display in a direction incident on a pupil from the eyepiece optical system. 5a. Note that actions of the correction optical elements corresponding to the virtual images V3, V2, and V1 are similar to those in the second embodiment illustrated in FIG. 6 described above, and description thereof is omitted herein.

Specific effects obtained by using the plurality of flat displays (liquid crystal display panels) described above are summarized below.

Figure 4:
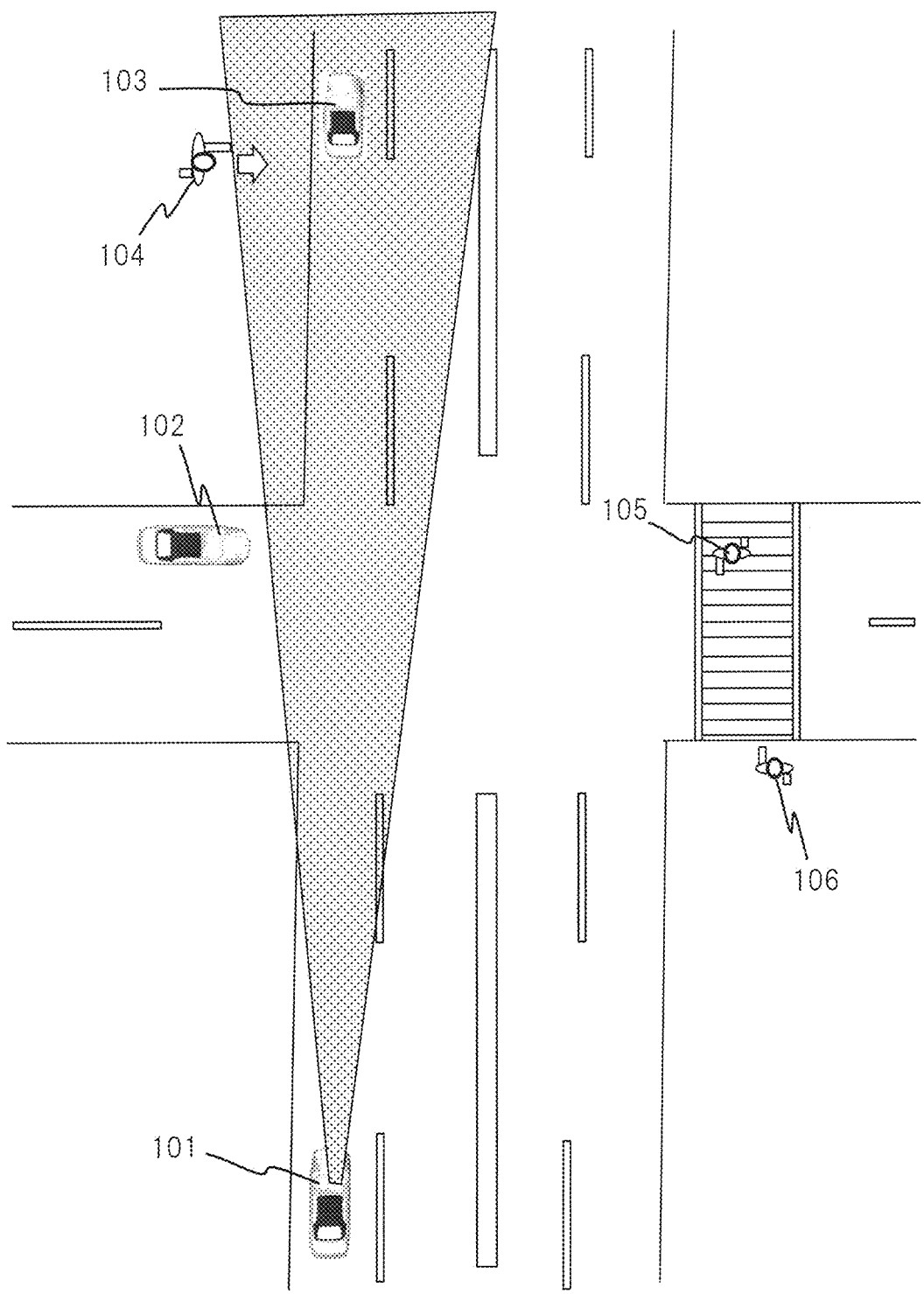
FIG. 4 is a schematic configuration diagram illustrating a region in one embodiment of the present invention, the driver watching the region while driving.

(1) A composite resolution can be enhanced by using the plurality of liquid display panels as the video image sources. As a result, since an information amount of the entire virtual image can be increased, the virtual image can be established over the almost entire area of the windshield 6 as illustrated in FIG. 3 described above. Note that the virtual image is usually established in an image display region 1(a), an image display region 1(c), or both of the image display regions 1(a) and 1 (c) in the drawing without being established over the entire surface of the windshield 6. As a result, as illustrated in FIG. 4 described above, the video image information and the attention attraction information from the peripheral monitoring device illustrated also in FIG. 1 described above, further information from the navigation system, and the like can be displayed so as to overlap a front field vision which the driver of the running automobile 101 watches while driving, and so-called virtual reality can be realized. Further, even when the driver attempts to turn right, the peripheral monitoring device recognizes the pedestrian's information to be a problem on safety in running, and then the attention attraction information overlaps with video image information having been shot, which becomes effective assistance for safe driving.

Additionally, if a problem on safety occurs for an automobile 102 which is running from left in a traveling direction, a video image of attention attraction in the image display region 2 illustrated in FIG. 3 described above is intermittently displayed etc., which makes it possible to be useful for enhancing safety recognition of the driver.

(2) Since the plurality of flat displays (liquid crystal display panels) are arranged at desired positions within an object plane range of the virtual image optical system, a virtual-image establishment position and a virtual-image magnification to be obtained can be controlled as needed.

(3) Since each direction of the liquid crystal display panels is further tilted in a direction incident on a pupil from the eyepiece optical system 5a, utilization efficiency of video image light can be improved and a bright virtual image can be obtained. Similarly, since the liquid crystal display panels are tilted so as to be advantageous to the correction of the aberrations and the aberrations in the respective virtual images to be established at the positions of arranging the liquid crystal display panels, a degree of freedom for design can be improved.

Figure 9:
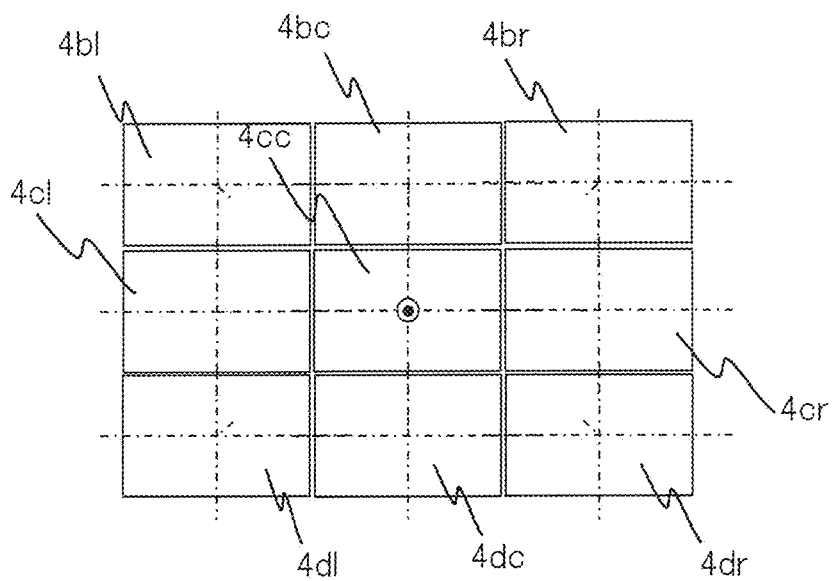
FIG. 9 is a configuration diagram illustrating an arrangement of a video image projection device in the information display apparatus according to one embodiment of the present invention.

As a result, the degree of freedom for design is more increased than that in the virtual image optical system 5 illustrated in FIG. 6 described above. Therefore, resolution performance and degrees of freedom for aberration correction and distortion correction can be improved, and concurrently the virtual image viewed from the driver's viewpoint position can be established at a desired position. FIG. 7 mentioned above describes an example in which the three liquid crystal display panels 4b, 4c, and 4d are arranged in parallel. However, the present invention is not limited to this. For example, the liquid crystal display panels may be tilted and arranged so as to correspond to the optical axis direction of the eyepiece optical system 5a as illustrated in FIG. 8. Alternatively, the flat displays may be arranged in a matrix shape as illustrated in FIG. 9. Further, it is needless to say that the above-described correction optical element may be inserted therein. At this time, similarly, it is also effective to improve the degrees of freedom for distortion correction and aberration correction by tilting each of the panels with respect to the optical axis of the virtual image optical system.

Other Embodiments

Figure 10:
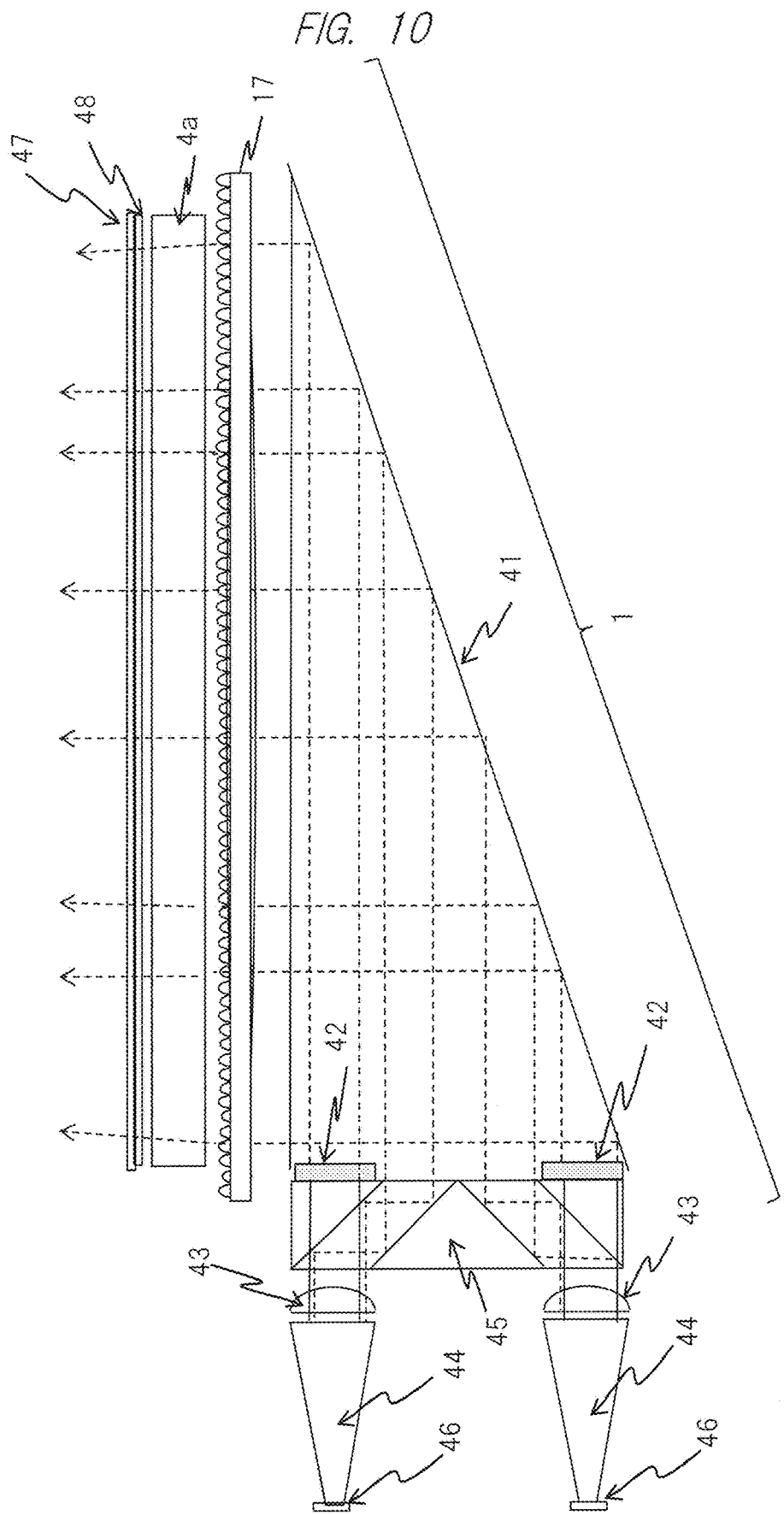
FIG. 10 is a cross-sectional view illustrating an outline of an entire structure of the information display apparatus according to one embodiment of the present invention.

FIG. 10 is a cross-sectional view illustrating an outline of the entire structure that includes a liquid crystal display panel 4a and a backlight 100 as a video image light source in an information display apparatus according to another embodiment of the present invention. A divergence angle of light emitted from a white LED 46 serving as a solid light source is reduced by a light funnel 44, and an intensity distribution of rays of the emitted light is made uniform. Then, the rays of the emitted light are changed substantially parallel by an optical element 43, and are aligned with a single polarized wave through a polarization-conversion PBS 45. Then, the emitted light is reflected on a reflection surface 41, and is incident on the liquid crystal display panel 4a. At this time, an optical element 17 for controlling an angle of a light flux incident on a liquid crystal display panel 4 is provided so that the video image light flux obtained by the liquid crystal display panel 4a becomes excellent in contrast performance.

Thus, the polarizing plates are provided on a light incidence surface and a light emission surface of the liquid crystal display element 4a, so that the video image light flux excellent in contrast performance can be obtained. Further, a λ/4 plate 46 is provided on the emission surface of the liquid crystal display panel 4a, so that the rays of the emitted light can be also changed to circularly polarized light. As a result, the driver can monitor the favorable virtual image(s) even if he/her wears polarized sunglasses.

Further, even if a reflective film of a reflective mirror used in the virtual image optical system is formed of a metal multilayer film, angular dependency of a reflectance is small, and the reflectance does not change depending on a polarization direction (a P wave or an S wave). Therefore, chromaticity and brightness of a screen can be uniformly kept.

Further, since an optical member 47 composed of a ultraviolet reflective film or a combination of a ultraviolet reflective film and an infrared reflective film is provided at the nearest position to the virtual image optical system 5, temperature rises and damages of the liquid crystal display panel and the polarizing plate can be reduced even if external light (solar light) is incident. Therefore, an effect of preventing reliability of the information display apparatus from being damaged is obtained.

<Others>

Although principal configurations of the information display apparatuses according to the respective embodiments of the present invention have been described in detail above, their configurations will be further collectively described below, and details of other configurations will be also described.

First, the video image projection device among them includes flat displays such as a single plate LCOS (Liquid Crystal On Silicon) equipped with a color liquid crystal panel or color filter of a TFT type and an OLED (Organic Light Emitting Diode). On the other hand, for a video image source (an intermediate image display section), there is a method for: modulating an intensity of light so as to be matched with a video image signal by a video image display element such as a small-sized liquid crystal panel or DMD (Digital Mirror Device); and enlarging and projecting the modulated light on the intermediate image display section by projection means. In addition thereto, when light-source light is scanned by a microscopic mirror in MEMS (Micro Electro Mechanical Systems), the video image information similar to that in the above-described video image projection device can be obtained. Therefore, the best image plane of the projection means or a video image plane obtained by scanning is made to be substantially matched with a planar shape of the intermediate image display section, and a degree of freedom for design of the virtual image optical system can be also increased as, for example, a spherical surface, an aspherical surface, or a free-form surface other than a plane. A plurality of intermediate image display sections may be installed to divide and display the video image (note that the intermediate image display sections are displayed as a single intermediate image display section in FIGS. 1 and 5).

Additionally, the virtual image optical system is optimally designed including a difference between a curvature radius of a windshield in a horizontal direction of a vehicle and a curvature radius thereof in a vertical direction of the vehicle, the windshield serving as a projected member in a conventional technique. A concave mirror in which a concave surface is directed toward a windshield side is arranged between the windshield and the video image projection device or intermediate image display section. For this reason, a video image(s) enlargedly projected onto the video image projection device or intermediate image projection section is further enlarged, and is reflected on the windshield. At this time, a plurality of optical elements are arranged between the above-described concave mirror and the video image projection device or intermediate display section. On the other hand, a video image light flux forming an enlarged image (virtual image) of the video image to be imaged so as to correspond to the viewpoint position of the driver passes through the plurality of optical elements arranged between the concave mirror and the video image projection device or intermediate image display section. In doing so, the video image light flux passes through the optical elements arranged at positions separate from one another. Therefore, since the optical elements are divided so as to correspond to each light flux and the optimum aberration correction is made, the virtual images having high visibility and corresponding to a plurality of viewpoint positions of the driver can be obtained.

Moreover, as illustrated also in FIG. 7 described above, since a plurality of small-sized video image display elements are arranged to constitute a video image projection device, a high resolution can be realized at low cost. Further, by changing arrangement positions of the plurality of video image display elements with respect to the above-described virtual image optical system, a generation position and a magnification of the virtual image viewed from the driver can be controlled.

More specifically, in the present invention, the virtual image which is obtained by reflection on an upper portion (an upper portion of a vehicle body in a vertical direction) of the windshield needs to be imaged farther. For this reason, to favorably image a video image light flux dispersed from upper portions of the video image projection device and the intermediate image display section on which a video image corresponding to such a virtual image displayed, a plurality of optical elements arranged between the above-described concave mirror and the video image projection device or intermediate image display section shorten a composite focal length f1 or lengthen an optical distance L1 by inserting an optical member having a refractive index of 1.0 or more. On the other hand, to nearer image a virtual image obtained by reflection on a lower portion (a lower portion of the vehicle body in the vertical direction) of the windshield, a composite focal length f2 needs to be lengthened or an optical distance L2 needs to be shortened. In other words, a relationship therebetween may be set to satisfy f1<f2. To realize the object of the present invention, necessary information may be displayed by dividing the video image projection device and the intermediate image display section into some portions, as described above. Alternatively, continuous information display can be also performed.

Further, in the one embodiment of the present invention illustrated in FIG. 1, the virtual image V3 obtained by reflection on the upper portion (the upper portion of the vehicle body in a vertical direction) of the windshield, needs to be imaged farther. For this reason, to favorably image a video image light flux dispersed from an upper portion of a video image projection device or intermediate image display section on which a video image corresponding to such a virtual image displayed, a composite focal length f1 of a plurality of optical elements arranged between the above-described concave mirror and the video image projection device or intermediate image display section may be set short. On the other hand, the virtual image V1 obtained by reflection on the lower portion (the lower portion of the vehicle body in the vertical direction) of the windshield needs to be imaged nearer. For this reason, to favorably image a video image light flux dispersed from the lower portion of the video image projection device or intermediate image display section on which a video image corresponding to such a virtual image displayed, a composite focal length f2 of a plurality of optical elements arranged between the above-described concave mirror and the video image projection device or intermediate image display section may be set relatively long.

Additionally, in the one embodiment of the present invention, the curvature radius of the windshield in a horizontal direction (parallel to the ground) and the curvature radius of the windshield in a vertical direction (a direction orthogonal to the horizontal direction of the windshield) differ from each other. Thus, optical elements, which differ in axial symmetry with respect to an optical axis, are arranged in the virtual image optical system in order to correct a screen distortion in the virtual image to be watched by a driver, and so the above-described distortion correction is realized.

Then, in the one embodiment of the present invention, a video image plane is configured as a flat panel display. Specific examples are flat panel displays such as a single plate LCOS (Liquid Crystal On Silicon) equipped with a color liquid crystal panel or color filter of a TFT type and an OLED (Organic Light Emitting Diode). A display screen size is preferably from approximately 1 inch to 5 inches, and is preferably up to approximately 3 inches by considering effective utilization of the video image light. As illustrated in FIG. 7, a desired resolution can be also obtained by using and combining a plurality of small-sized flat displays.

In this case, since the video image projection device itself becomes a video image source of a virtual image optical system, the display surface becomes a plane. Therefore, as a degree of freedom for design, there exists a degree of freedom for correcting etc. a trapezoidal distortion in consideration of a slope of the windshield to be tilted with respect to the optical axis of the virtual image optical system. Further, in an information display apparatus using a plurality of flat displays, the generation position and the magnification of the virtual image described above can be similarly controlled also by changing the places arranging the small-sized flat displays with respect to the virtual image optical system.

Additionally, an optical element having a condensing action is arranged so that the video image light flux reaches the viewpoint position of the driver between the video image plane and the virtual image optical system, and light rays emitted from the video image plane are made to efficiently reach the eyes of the driver through the virtual image optical system. In a video image projection device using only specific polarized light such as a single plate LCOS (Liquid Crystal On Silicon), which is equipped with a color liquid crystal panel or color filter of a TFT type, or an OLED (Organic Light Emitting Diode), when an optical element polarizing and converting light-source light to extract only a desired polarized wave component is provided between a light source and the video image projection device, the light-source light can be effectively utilized. Further, since a divergence angle of the light-source light is controlled to use only an angle component having high contrast performance in light outputted from the above-described video image projection device, contrast performance of the video image can be also enhanced.

Moreover, respective center positions of the curvature radius of the windshield in the vertical direction of the vehicle body and the curvature radius of the windshield in the horizontal direction of the vehicle body are different from the position of the eyes of the driver if the plurality of viewpoint positions of the driver by changing etc. the driver exist on a reflection surface of the windshield. For this reason, distortions of images to be obtained in the virtual images differ from each other. Therefore, to measure the viewpoint position of the driver within an automobile, for example, a position of a pupil (s) of the driver is measured by using a camera or the like, and a display image(s) onto the video image projection device may be distorted to previously correct the distortion occurring in the virtual image.

Further, a distortion of a displayed character (s) or figure (s) caused by a shape of the reflection surface of the windshield and the viewpoint position of the driver as described above is varied by changing an aspect ratio of the character or figure depending on a position of the display image, which makes it possible to represent a shape of the virtual image watched by the driver more naturally (at a more correct aspect ratio).

As a result of the foregoing, according to the information display apparatus that is the one embodiment of the present invention, the virtual images having high visibility can be formed at the plurality of viewpoint positions (different distances) of the driver. Further, the information display apparatus according to the one embodiment of the present invention can realize a simpler configuration than those in the techniques disclosed in Patent Document 1 and Patent Document 2 described above, that is, can inhibit the upsizing and complication of an apparatus structure as much as possible.

Additionally, in the information display apparatus according to the one embodiment of the present invention, the focal length of the projection means need not be adjusted at high speed so as to be matched with each imaging means in comparison with the technique described in Patent Document 2 described above, and the virtual image can be formed at the position, which is adapted to the sight line of the driver, such as a short distance (corresponding to the lower portion of the windshield) or a long distance (corresponding to the upper portion of the windshield) by a low-cost and simple configuration. As a result, provided can be the information display apparatus excellent in usability for a user.

EXPLANATION OF REFERENCE CHARACTERS

1 . . . Information display device; 100 . . . Backlight; 2 . . . Liquid crystal display panel; 3 . . . Relay optional system; 4 . . . Intermedium image forming section (diffusion plate); 5a . . . Eyepiece optical system (optical component); 5 . . . Virtual image optical system; 6 . . . projected member (windshield); 7 . . . Virtual image surface; 8 . . . Eyebox; 9 . . . eyes of observer; 10 . . . Image forming unit; 11 . . . Video image projection device; 17 . . . Optical element; 20 . . . Projection optical system; 21 . . . Optical element; 22 . . . Optical element; 23 . . . Optical element; 41 . . . Reflection surface; 42 . . . λ/2 plate; 43 . . . Optical element; 44 . . . Light funnel; 45 . . . PBS; 46 . . . Solid light source; 47 . . . Ultraviolet and infrared reflective sheets; 48 . . . λ/4 plate; 51 . . . Optical element (stepped filter); 52 . . . Convex lens (first optical element); 53 . . . Concave lens (second optical element); 54 . . . Free-form surface lens; 55 . . . Cylinder mirror (reflective mirror); 56 . . . Free-form surface mirror (reflective mirror); and V1, V2, V3 . . . Virtual image.

The invention claimed is:

1. An information display apparatus displaying a virtual image onto a windshield of a vehicle based on video image information, the information display apparatus comprising:
   a flat display displaying a video image based on the video image information; and
   a virtual image optical system displaying a plurality of virtual images at a plurality of positions at different distances ahead of the vehicle in terms of a viewpoint position of a driver by causing light emitted from the flat display to reflect on the windshield based on a plurality of optical elements,
   wherein
   the virtual image optical system includes, on an optical path of video image light, a concave mirror arranged between the flat display and the windshield, and the plurality of optical elements which are arranged between the flat display and the concave mirror,
   the plurality of optical elements are arranged correspondingly to respective positions through which respective video image light fluxes for establishing the respective virtual images from the flat display pass, the plurality of virtual images being at least established so as to cause a virtual image V3 overlapping a background to be established in an upper portion of the windshield, and cause a virtual image V1 overlapping a foreground to be established toward a lower portion from the upper portion of the windshield, and the plurality of optical elements include respective optical elements for aberration correction and optical distance conversion,
   respective sizes of the virtual image V3 and the virtual image V1 further satisfy a relationship (V3>V1) in which the size of the virtual image V3 is larger than the size of the virtual image V1,
   a plurality of video images are divided and displayed on a screen of the flat display based on the video image information corresponding to the respective positions, through which the respective video image light fluxes pass, in order to form the plurality of virtual images,
   the plurality of optical elements cause a video image light flux for the virtual image V1 to be shorter in optical distance and lower in magnification than a video image light flux for the virtual image V3,
   the plurality of virtual images are established, from the upper portion of the windshield toward the lower portion thereof, as the virtual image V3 overlapping a position of the background, a virtual image V2 overlapping a position of a middle ground between the virtual images V3 and V1, and the virtual image V1 overlapping a position of the foreground,
   the plurality of optical elements include: a first optical element arranged at a position through which a first video image light flux for the virtual image V1 passes; and a second optical element arranged at a position through which a second video image light flux for the virtual image V2 passes,
   the first optical element causes the first video image light flux to be shorter in optical distance and lower in magnification,
   the second optical element causes the second video image light flux to be shorter in optical distance and lower in magnification, and
   no optical element is arranged at a position through which a third video image light flux for the virtual image V3 passes.

2. The information display apparatus according to claim 1,
   wherein the virtual image optical system comprises, after the plurality of optical elements on the optical path, a first lens having positive refractive power and a second lens having negative refractive power, and the first lens and the second lens are independently arranged in order toward the concave mirror from a side of the flat display.

3. The information display apparatus according to claim 1, further comprising a camera to a position of a pupil of the driver of the vehicle, and the detected pupil's position is used to distort a video image to be displayed on the screen of the flat display so as to correct a distortion generated previously in the virtual image.

4. The information display apparatus according to claim 1,
   wherein the flat display includes a liquid crystal display panel.

5. The information display apparatus according to claim 4,
   wherein the flat display includes a plurality of liquid crystal display panels composed of the liquid crystal display panel so as to divide and display the plurality of video images.

6. The information display apparatus according to claim 5,
   wherein the plurality of liquid crystal display panels comprise: a first liquid crystal display panel that emits a first video image light flux corresponding to the virtual image V1; a second liquid crystal display panel that emits a second video image light flux corresponding to a virtual image V2 between the virtual images V1 and V3; and a third liquid crystal display panel that emits a third video image light flux corresponding to the virtual image V3, and
   a direction of an optical axis of the first liquid crystal display panel and a direction of an optical axis of the third liquid crystal display panel are arranged so as to be tilted toward an optical axis of light of the flat display.

7. The information display apparatus according to claim 4,
   wherein the liquid crystal display panel serving as the flat display comprises: a solid light source; an optical element which reduces a divergence angle of divergent light emitted from the solid light source; an optical member polarizing and converting the divergent light that has the reduced divergence angle; and a reflection source which causes light from the optical member to be reflected and incident on the liquid crystal panel.

8. The information display apparatus according to claim 4,
   wherein a λ/4 plate is provided on a side of the virtual image optical system in the liquid crystal display panel serving as the flat display.

9. The information display apparatus according to claim 4, further comprising a film reflecting ultraviolet rays, infrared rays, or ultraviolet and infrared rays on the side of the virtual image optical system in the liquid crystal display panel serving as the flat display.

10. The information display apparatus according to claim 1,
    wherein the virtual image optical system has a free-form surface lens and a cylinder mirror that are arranged between the concave mirror and the plurality of optical elements and after the plurality of optical elements on the optical path, the free-form surface lens has a shape for correcting distortion of each of the virtual images, and the cylinder mirror has a shape for correcting distortion of each of the virtual images due to a difference between horizontal and vertical curvature radii of the windshield.

11. An information display apparatus displaying, based on video image information, a plurality of virtual images at positions different in distance onto a windshield of a vehicle in terms of a viewpoint position of a driver, the information display apparatus comprising:

a display forming a plurality of video images for the plurality of virtual images based on the video image information; and a virtual image optical system including the windshield and causing the plurality of virtual images to be displayed at the plurality of positions at different distances ahead of the vehicle in terms of the viewpoint position of the driver by reflecting, on the windshield, light emitted from the display based on a plurality of optical elements, and the display having a lens that forms, as an intermediate image, light including the plurality of video images, wherein the virtual image optical system: includes a mirror arranged between the windshield and the lens on an optical path of the light; is an optical system that causes the intermediate image obtained by enlargement and projection on the display to differ in their distances and magnifications and be established as the plurality of virtual images with respect to the driver through the mirror and the windshield; and has respective optical elements arranged as the plurality of optical elements corresponding to positions through which the respective video image light fluxes for establishing respective virtual images of the plurality of virtual images from the display pass so as to cause a virtual image V3 overlapping a background to be established in an upper portion of the windshield and cause a virtual image V1 overlapping a foreground to be established toward a lower portion from the upper portion of the windshield, the virtual images V3 and V1 being established between the windshield and the display, and the plurality of optical elements include the respective optical elements for aberration correction and optical distance conversion, sizes of the virtual image V3 and the virtual image V1 further satisfy a relationship (V3>V1) in which the size of the virtual image V3 is larger than the size of the virtual image V1, the display divides and displays the plurality of video images in a screen correspondingly to the respective positions through which the respective video image light fluxes pass, the plurality of optical elements cause, as the optical distance conversion, a video image light flux for the virtual image V1 to be shorter in optical distance and lower in magnification than a video image light flux for the virtual image V3, the plurality of virtual images are established, from the upper portion of the windshield toward the lower portion thereof, as the virtual image V3 overlapping a position of the background, a virtual image V2 overlapping a position of a middle ground between the virtual images V3 and V1, and the virtual image V1 overlapping a position of the foreground, the plurality of optical elements include: a first optical element arranged at a position through which a first video image light flux for the virtual image V1 passes; and a second optical element arranged at a position through which a second video image light flux for the virtual image V2 passes, the first optical element causes the first video image light flux to be shorter in optical distance and lower in magnification, the second optical element causes the second video image light flux to be shorter in optical distance and lower in magnification, and no optical element is arranged at a position through which a third video image light flux for the virtual image V3 passes.

12. The information display apparatus according to claim 11, wherein the virtual image optical system comprises a concave mirror as the mirror; a first lens that is arranged after the plurality of optical elements on the optical path and has positive refractive power; and a second lens having negative refractive power, and the first lens and the second lens are independently arranged in order toward the concave mirror from a side of the intermediate image forming section.

13. The information display apparatus according to claim 11, wherein the display comprises: a light source; a liquid crystal display panel having a transmissive property and displaying the plurality of video images; a relay optical system on which a light flux emitted from the light source and transmitting the liquid crystal panel is to be incident, the light flux including a plurality of video image light fluxes of the plurality of video images; and a screen plate on which light fluxes enlarged and projected from the relay optical system are incident and that has a diffusion function as the lens.

14. The information display apparatus according to claim 11, further comprising a camera to detect a position of a pupil of a driver of the vehicle, and the detected pupil's position is used to distort the plurality of video images displayed by the display so as to correct a distortion generated previously in the virtual image.

* * * * *